(12) United States Patent
Etwaru et al.

(10) Patent No.: US 11,277,658 B1
(45) Date of Patent: Mar. 15, 2022

(54) INTEGRATING OVERLAID DIGITAL CONTENT INTO DISPLAYED DATA VIA GRAPHICS PROCESSING CIRCUITRY

(71) Applicant: BEAM, INC., Sparta, NJ (US)

(72) Inventors: Dharmendra Etwaru, Sparta, NJ (US); Mike Sutcliff, Inlet Beach, FL (US)

(73) Assignee: BEAM, INC., Sparta, NJ (US)

( * ) Notice: Subject to any disclaimer, the term of this patent is extended or adjusted under 35 U.S.C. 154(b) by 0 days.

(21) Appl. No.: 17/408,065

(22) Filed: Aug. 20, 2021

Related U.S. Application Data

(60) Provisional application No. 63/213,326, filed on Jun. 22, 2021, provisional application No. 63/189,434, filed on May 17, 2021, provisional application No. 63/182,391, filed on Apr. 30, 2021, provisional application No. 63/172,640, filed on Apr. 8, 2021, provisional application No. 63/068,878, filed on Aug. 21, 2020.

(51) Int. Cl.
*H04N 21/431* (2011.01)
*G06T 1/20* (2006.01)
*G06F 16/783* (2019.01)
*H04N 21/8352* (2011.01)
*G06F 16/78* (2019.01)
*H04N 21/81* (2011.01)

(52) U.S. Cl.
CPC ....... *H04N 21/4316* (2013.01); *G06F 16/783* (2019.01); *G06F 16/7867* (2019.01); *G06T 1/20* (2013.01); *H04N 21/8146* (2013.01); *H04N 21/8352* (2013.01)

(58) Field of Classification Search
CPC .......... H04N 21/4316; H04N 21/8146; H04N 21/8352; G06F 16/783; G06F 16/7867; G06T 1/20
See application file for complete search history.

(56) References Cited

U.S. PATENT DOCUMENTS

| 10,567,733 B2 * | 2/2020 | Cole .................... H04N 13/239 |
| 2008/0066092 A1 * | 3/2008 | Laude .............. H04N 21/44008 725/20 |

(Continued)

OTHER PUBLICATIONS

International Search Report and Written Opinion of the International Searching Authority dated Nov. 23, 2021, in PCT/US 21/46976, filed Aug. 20, 2021.

*Primary Examiner* — Fernando Alcon
(74) *Attorney, Agent, or Firm* — Oblon, McClelland, Maier & Neustadt, L.L.P.

(57) ABSTRACT

An apparatus, method, and computer readable medium that include accessing a frame buffer of a graphics processing unit (GPU), analyzing, in the frame buffer of the GPU, a frame representing a section of a stream of displayed data that is being displayed by an apparatus, identifying a reference patch that includes a unique identifier associated with an available area in which secondary digital content is insertable in the displayed data that is being displayed by the apparatus, decoding the encoded data of the unique identifier, retrieving the secondary digital content from the remote device based on the unique identifier, and overlaying the secondary digital content into the displayed data in accordance with the available area, the screen position, and the size identified by the unique identifier.

20 Claims, 25 Drawing Sheets

(56) References Cited

U.S. PATENT DOCUMENTS

| | | | |
|---|---|---|---|
| 2012/0169928 A1* | 7/2012 | Casagrande | H04N 21/6543 |
| | | | 348/461 |
| 2014/0201769 A1* | 7/2014 | Neumeier | H04N 21/235 |
| | | | 725/14 |
| 2015/0074735 A1 | 3/2015 | Herigstad et al. | |
| 2017/0155933 A1* | 6/2017 | Del Strother | H04N 21/8358 |
| 2017/0278289 A1 | 9/2017 | Marino et al. | |
| 2018/0046602 A1* | 2/2018 | Sisson | G06F 16/972 |
| 2018/0124370 A1* | 5/2018 | Bejot | G11B 27/036 |
| 2019/0213625 A1* | 7/2019 | Bhattacharjee | G06Q 20/10 |
| 2020/0169736 A1* | 5/2020 | Petajan | H04N 21/44008 |
| 2021/0168416 A1* | 6/2021 | Weiner | H04N 21/812 |
| 2021/0192302 A1* | 6/2021 | Wang | G06K 19/06028 |

\* cited by examiner

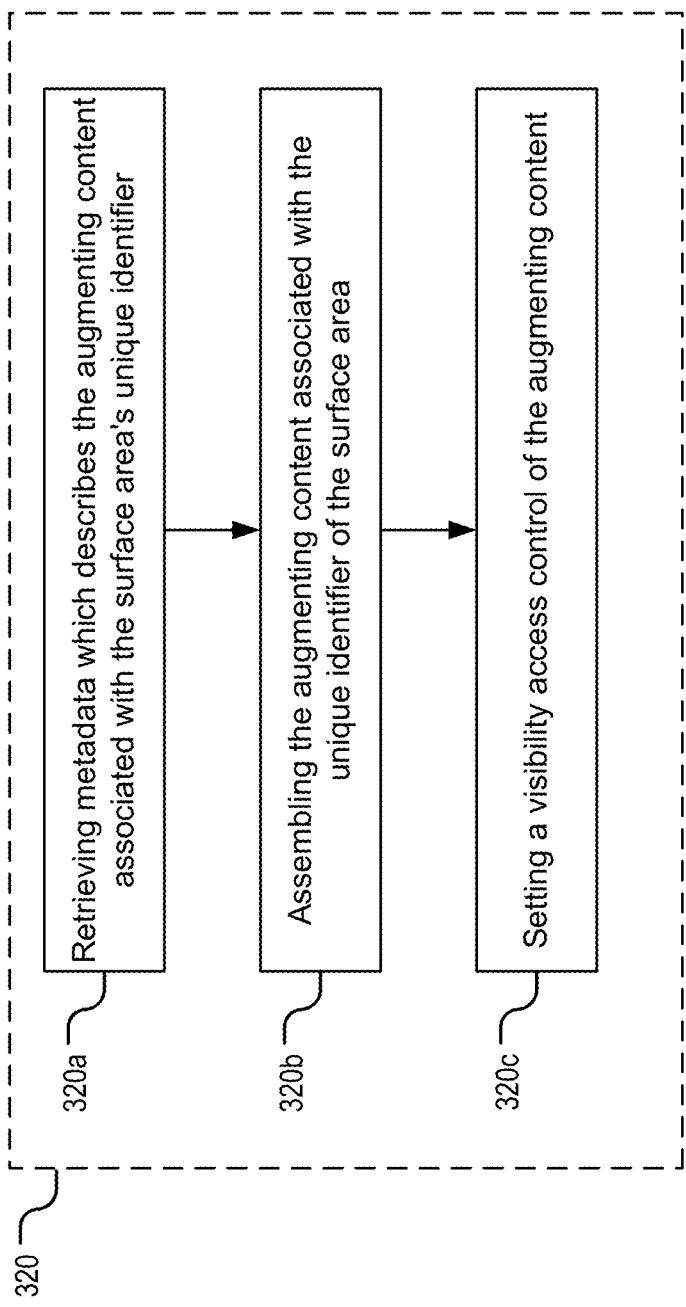

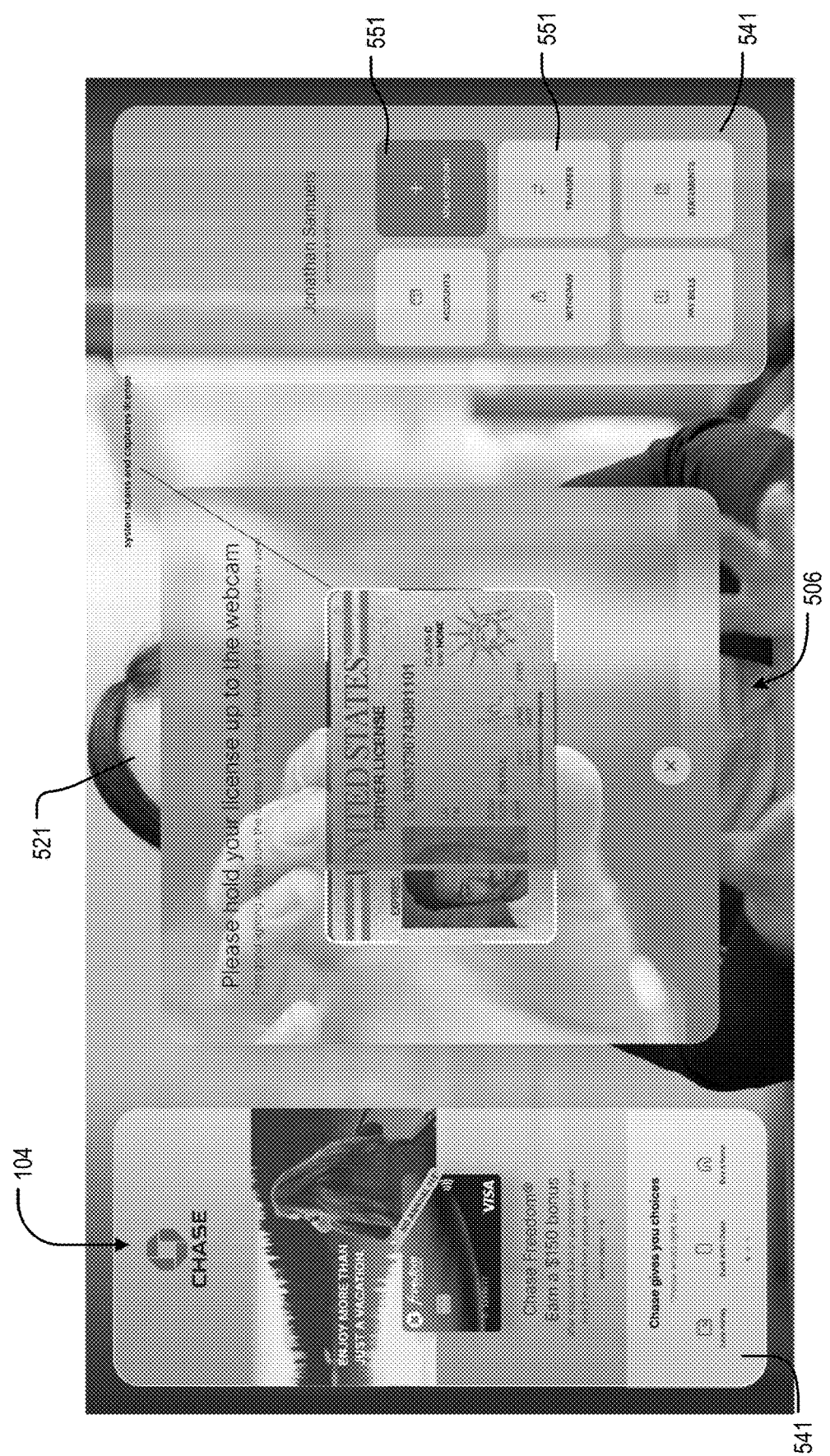

INTEGRATING OVERLAID DIGITAL CONTENT INTO DISPLAYED DATA VIA GRAPHICS PROCESSING CIRCUITRY

CROSS-REFERENCE TO RELATED APPLICATIONS

The present application claims priority to U.S. Provisional Application No. 63/068,878, filed Aug. 21, 2020, U.S. Provisional Application No. 63/172,640, filed Apr. 8, 2021, U.S. Provisional Application No. 63/182,391, filed Apr. 30, 2021, U.S. Provisional Application No. 63/213,326, filed Jun. 22, 2021, U.S. Provisional Application No. 63/189,434, filed May 17, 2021, the entire content of each of these applications is incorporated by reference herein in its entirety for all purposes.

FIELD OF THE DISCLOSURE

The present disclosure relates to overlaying digital content into displayed data via graphics processing circuitry.

DESCRIPTION OF THE RELATED ART

Displayed data has traditionally been presented within the bounds of a two-dimensional geometric screen. The visual experience of such displayed data is thus lacking in dynamism that allows for the layering of functionality within a given display frame.

The foregoing description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

Accordingly, the present disclosure provides methods for overlaying displayed data into displayed data and generating augmented visual experiences that are informative and interactive.

The present disclosure relates to an apparatus, including: processing circuitry, including a graphics processing unit (GPU), configured to access a frame buffer of the GPU, analyze, in the frame buffer of the GPU, a frame representing a section of a stream of displayed data that is being displayed by the apparatus, based on the analyzed frame, identify a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data, decode the encoded data of the unique identifier, after decoding the encoded data of the unique identifier, retrieve the secondary digital content from the remote device based on the unique identifier, and after retrieving the secondary digital content from the remote device, overlay the secondary digital content into the displayed data in accordance with the available area, the screen position, and the size identified by the unique identifier.

The present disclosure also relates to a method, including: accessing a frame buffer of a graphics processing unit (GPU); analyzing, in the frame buffer of the GPU, a frame representing a section of a stream of displayed data that is being displayed by an apparatus; based on the analyzed frame, identifying a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data; decoding the encoded data of the unique identifier; after decoding the encoded data of the unique identifier, retrieving the secondary digital content from the remote device based on the unique identifier; and after retrieving the secondary digital content from the remote device, overlaying the secondary digital content into the displayed data in accordance with the available area, the screen position, and the size identified by the unique identifier.

The present disclosure also relates to a non-transitory computer-readable storage medium for storing computer-readable instructions that, when executed by a computer, cause the computer to perform a method, the method including: accessing a frame buffer of a graphics processing unit (GPU); analyzing, in the frame buffer of the GPU, a frame representing a section of a stream of displayed data that is being displayed by an apparatus; based on the analyzed frame, identifying a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data; decoding the encoded data of the unique identifier; after decoding the encoded data of the unique identifier, retrieving the secondary digital content from the remote device based on the unique identifier; and after retrieving the secondary digital content from the remote device, overlaying the secondary digital content into the displayed data in accordance with the available area, the screen position, and the size identified by the unique identifier.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3C is a flow chart of a sub-method of associating the unique identifiers with digital content, according to an exemplary embodiment of the present disclosure.

FIG. 5C is an illustration of an implementation of a method, according to an exemplary embodiment of the present disclosure.

DETAILED DESCRIPTION

Figure 1:
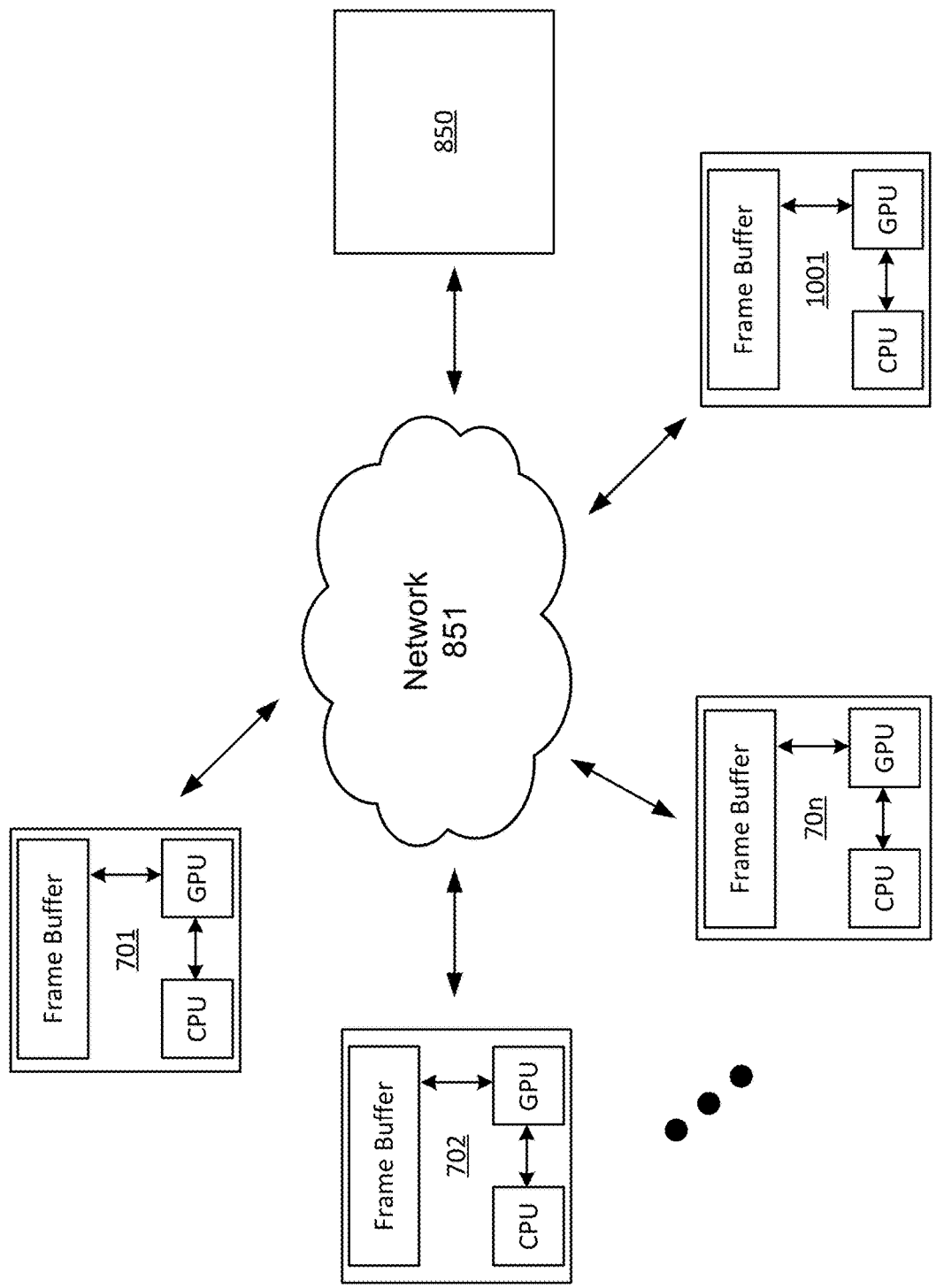
FIG. 1 is a schematic view of user devices communicatively connected to a server, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

According to an embodiment, the present disclosure relates to augmentation of a digital user experience. The augmentation may include an overlaying of digital objects onto a viewable display area of a display of an electronic device. The electronic device may be a mobile device such as a smartphone, tablet, and the like, a desktop computer, or any other electronic device that displays information. The digital objects may include text, images, videos, and other graphical elements, among others. The digital objects may be interactive. The digital objects may be associated with third-party software vendors.

In order to realize the augmentation of a digital user experience, a reference patch, that is a region of interest acting as an anchor, can be used. In one embodiment, the reference patch or other visually detectable element may serve to indicate a position at which digital content is to be placed onto a display. In some embodiments and as described herein, the reference patch may include encoded information that may be used to retrieve digital content and place that digital content into a desired location or locations in displayed data. The reference patch can be embedded within displayed data (such as, but not limited to, an image, a video, a document, a webpage, or any other application that may be displayed by an electronic device). The reference patch can include unique identifying data, a marker, or encoding corresponding to predetermined digital content. The reference patch can indicate to the electronic device the particular content that is to be displayed, the position at which the content is to be placed, and the size with which the content is to be displayed. Accordingly, when a portion of the displayed data including the reference patch is visible in a current frame of displayed data, the corresponding content can be overlaid on the current frame of the displayed data.

The above-described augmentations are particularly relevant to environments where the underlying content is static. Static content may include textual documents or slide decks. Often, the static content is stored locally in the electronic device. Due to its nature, the static content is not capable of being dynamically adjusted according to complex user interactions, in real-time, during a user experience. Such a digital user experience is cumbersome and inefficient. Thus, a heightened, augmented user experience is desired to provide increased convenience, engagement, and agility. The augmentations described herein reduce cumbrousness by providing a visual representation/aid of retrieved external digital content, and provide improved engagement of the user, agility of navigation through the displayed data, and overall performance of the user device.

Described herein is a device and method to incorporate a reference patch with encoded identifier attributes, where the reference patch serves as a conduit for delivering content into the displayed data.

Referring now to the figures, FIG. 1 is a schematic view of an electronic device, such as a client/user device (a first device 701) communicatively connected, via a network 851, to a second electronic device, such as a server (a second device 850), and a generating device 1001, according to an embodiment of the present disclosure. Further, in an embodiment, additional client/user devices can be communicatively connected to both the first device 701 and the second device 850. A second client/user device (a third device 702) can be communicatively connected to the first device 701 and the second device 850. As shown, a plurality of the client/user devices can be communicatively connected to, for example, an Nth user device 70*n*.

An application may be installed or accessible on the first device 701 for executing the methods described herein. The application may also be integrated into the operating system of the first device 701. The first device 701 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like.

Figure 6:
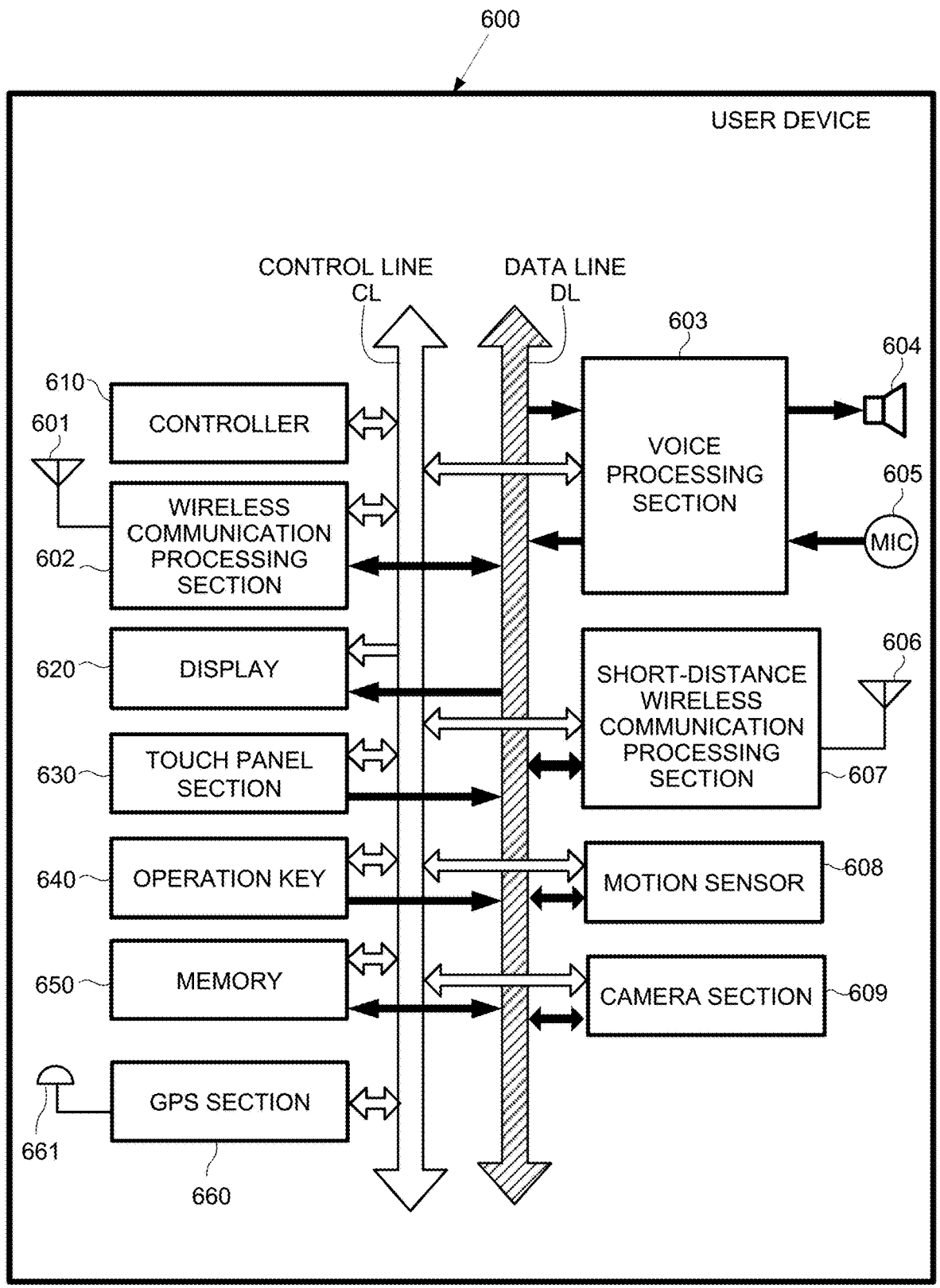
FIG. 6 is a block diagram illustrating an exemplary electronic user device, according to certain embodiments of the present disclosure.
Figure 7:
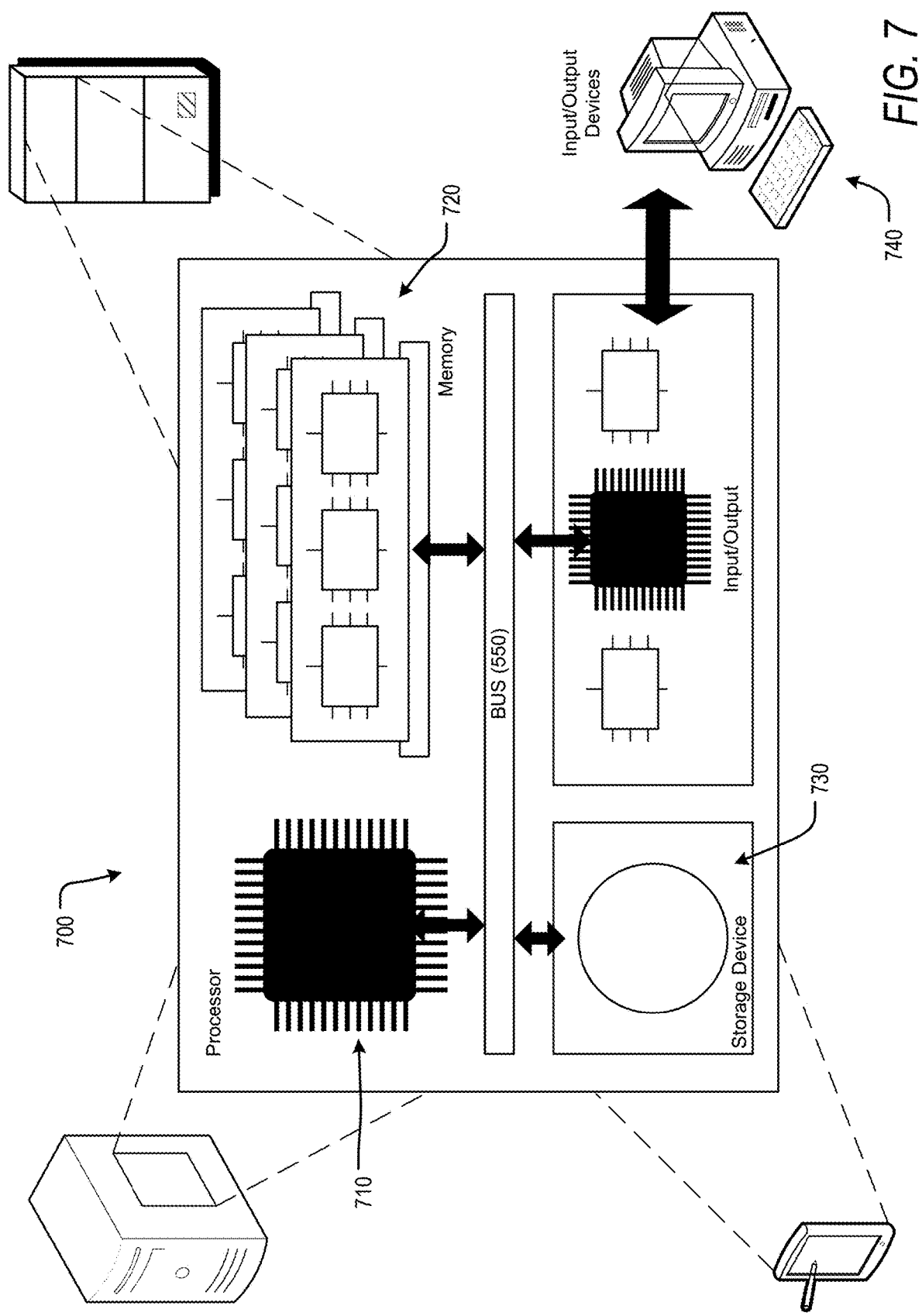
FIG. 7 is a schematic of a hardware system for performing a method, according to an exemplary embodiment of the present disclosure.
Figure 8:
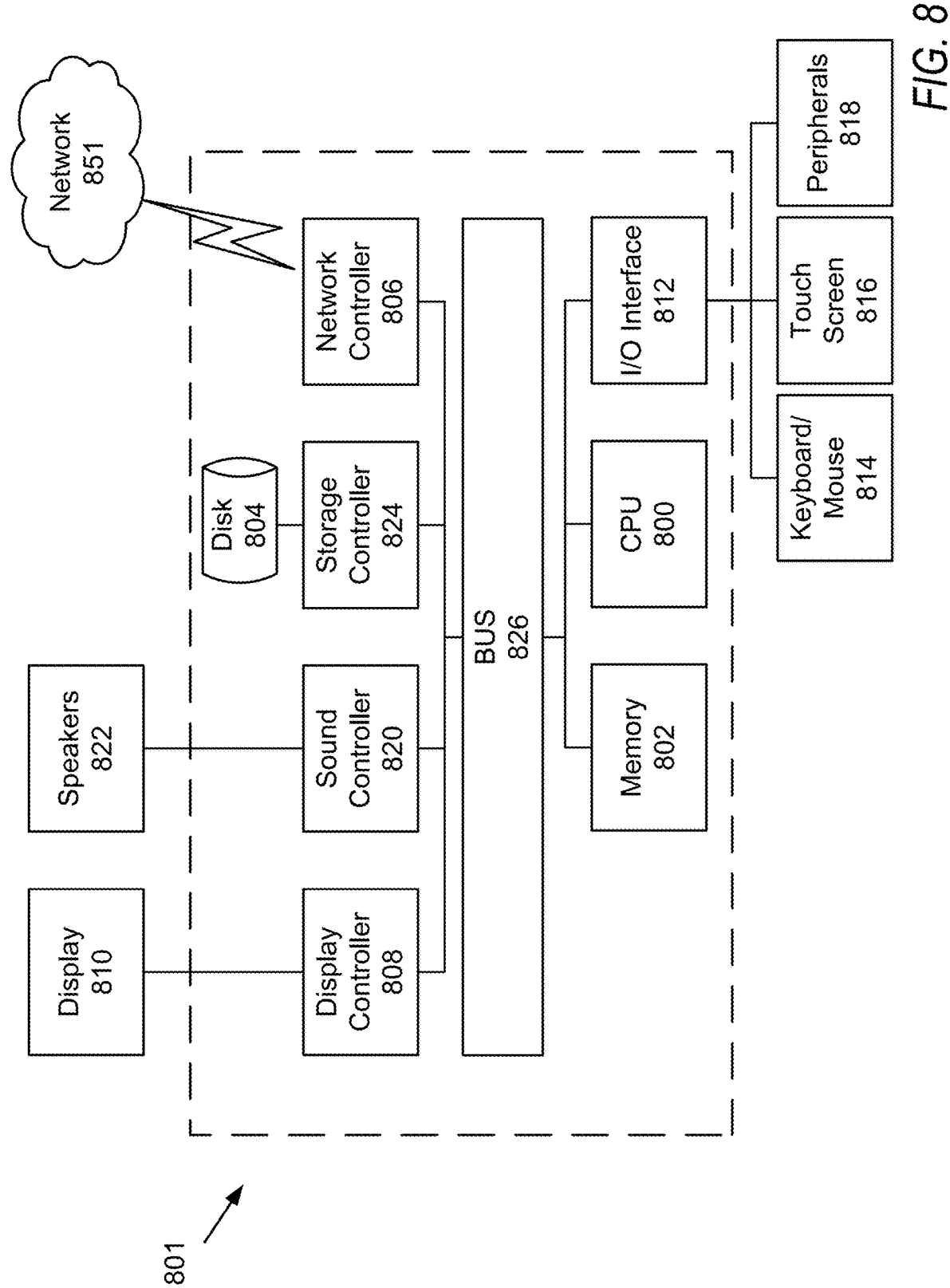
FIG. 8 is a schematic of a hardware configuration of a device for performing a method, according to an exemplary embodiment of the present disclosure.

As illustrated in FIG. 1, the first device 701 includes a CPU, a GPU, and a frame buffer, among other components (discussed in more detail in FIGS. 6-8). In an embodiment, the first device 701 can call graphics that are displayed on a display. The graphics of the first device 701 can be processed by the GPU and rendered in scenes stored on the frame buffer that is coupled to the display. The CPU can have an associated CPU memory and the GPU can have an associated video or GPU memory. The frame buffer may be an allocated area of the video memory. It can be understood that the CPU may have multiple cores or may itself be one of multiple processing cores in the first device 701. The CPU can execute commands in a CPU programming language such as C++. The GPU can execute commands in a GPU programming language such as HLSL. The GPU may also include multiple cores that are specialized for graphic processing tasks. Although the above description was discussed with respect to the first device 701, it is to be understood that the same description applies to the other devices (701, 702, 70*n*, and 1001) of FIG. 1. Although not illustrated in FIG. 1, the second device 850 can also include a CPU, GPU, and frame buffer.

Figure 2A:
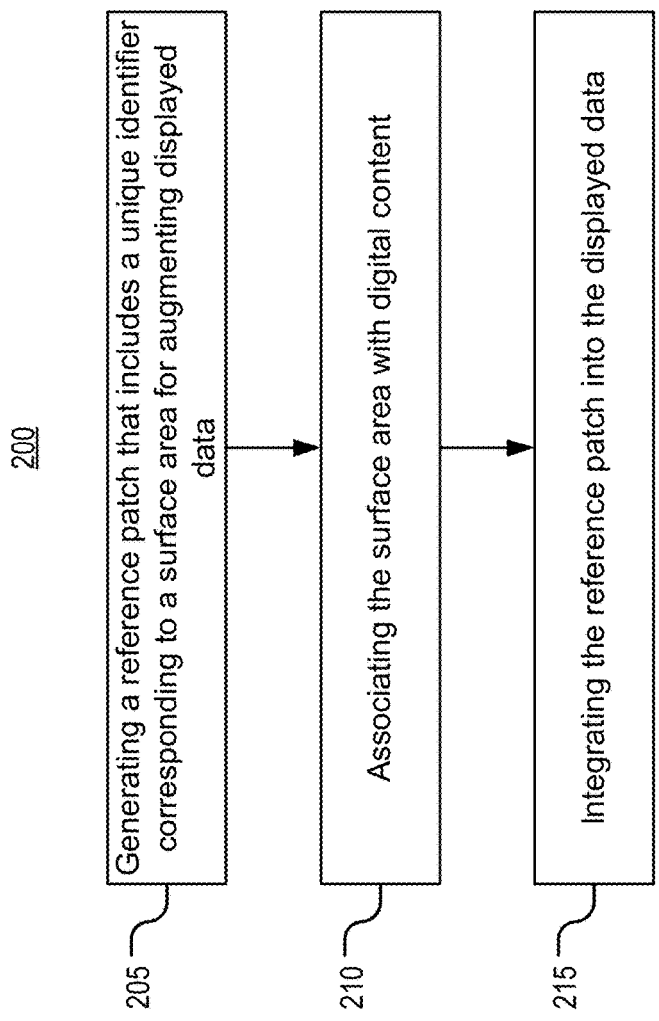
FIG. 2A is a flow chart for a method of generating a reference patch and embedding the reference patch into displayed data, according to an exemplary embodiment of the present disclosure.

FIG. 2A is a flow chart for a method 200 of generating a reference patch and embedding the reference patch into displayed data, according to an embodiment of the present disclosure. The present disclosure describes generation of the reference patch and embedding of this patch into the displayed data content in order to integrate additional content on the first device 701. In an embodiment, the first device 701 can incorporate digital content into what is already being displayed (displayed data) for a more immersive experience.

In this regard, the first device 701 can generate the reference patch in step 205. The reference patch can be an object having an area and shape that is embedded in the displayed data at a predetermined location in the displayed data. For example, the reference patch can be a square overlayed and disposed in a corner of a digital document (an example of displayed data), wherein the reference patch can be fixed to a predetermined page for a multi-page (or multi-slide) digital document. The reference patch can thus also represent a region of interest in the digital document. The reference patch can be an object that, when not in a field of view of the user, is inactive. The reference patch can, upon entering the field of view of the user, become active. For example, the reference patch can become active when detected by the first device 701 in the displayed data. When active, the reference patch can retrieve digital content and augment the displayed data by incorporating the retrieved digital content into the displayed data. Alternatively, the reference patch can become active when being initially located within the frame of the screen outputting the displayed data. For example, even if another window or popup is placed over top of the reference patch, the reference patch may continue to be active so long as the reference patch remains in the same location after detection and the window including the document incorporating the reference patch is not minimized or closed. As will be described further below, the reference patch can have a predetermined design that can be read by the first device 701, leading to the retrieval and displaying of the digital content.

In an embodiment, the first device 701 can use a geometrical shape for the reference patch for placement into any displayed data using applications executed in the first device 701. The reference patch can take any shape such as a circle, square, rectangle or any arbitrary shape. In step 210, the reference patch can also have predetermined areas within its shape for including predetermined data. The predetermined data can be, for example, unique identifiers that correspond to a surface area of the displayed data. The unique identifiers can be, for example, a marker. As will be described below, the marker can take the form of patterns, shapes, pixel arrangements, pixel luma, and pixel chroma, among others. The surface area, by way of the unique identifiers, can be associated with predetermined digital content that is recalled and displayed at the corresponding surface area in the displayed data. The unique identifier can include encoded data that identifies the digital content, a location address of the digital content at the second device 850 (see description below), a screen position within the surface area at which the digital content is insertable in the displayed data, and a size of the digital content when inserted in the displayed data (adjustable before being displayed).

That is, in an embodiment, the surface area (or an available area in which digital content is insertable/to be inserted) of the displayed data can be portion(s) of the displayed data that do not include objects that might obscure the reference patch or the digital content displayed at the corresponding surface area in the displayed data. For example, the first device 701 can use computer vision (described below) to detect the objects. For example, a slide in a slide deck can include text, pictures, logos, and other media, and the surface area can be the blank space or spaces around the aforementioned objects. Thus, the digital content can be displayed somewhere in the blank spaces. In an embodiment, the surface area of the displayed data can include portions of the displayed data that already include objects and the digital content can be displayed at the same location as the objects. For example, a slide in a slide deck can include a picture of a user, and the reference patch can be the area representing a face of the user and the digital content can be displayed at the same location as a body of the user. For example, a slide in a slide deck can include an image of a vehicle and the reference patch can be disposed in a blank space of the displayed data, while the digital content retrieved (e.g., a new car paint color and new rims) can be displayed over the image of the vehicle. In other words, the digital content may be placed in a blank area of the displayed data and/or in an area that is not blank (i.e., an area that includes text, image(s), video(s), etc.).

In step 215, the first device 701 can embed the reference patch into the displayed data, such as a word processing document file (i.e., DOC/DOCX) provided by e.g., Microsoft® Word, in a Portable Document Format (PDF) file such as the ones used by Adobe Acrobat®, in a Microsoft® PowerPoint presentation (PPT/PPTX), or in a video sequence file such as MPEG, MOV, AVI or the like. These file formats are illustrative of some file types which a user may be familiar with; however, applications included in the first device 701 are not limited to these types and other applications and their associated file types are possible.

The reference patch (or similar element) can be embedded into any displayed data, where the displayed data may be generated by an application running on or being executed by the first device 701. The reference patch can encompass the whole area designated by the displayed data, or just a portion of the area designated by the displayed data. The method of generating the reference patch and embedding the reference patch into the displayed data has been described as being performed by the first device 701, however, the second device 850 can instead perform the same functions. In order to be detected in the displayed data on the first device 701, the reference patch may only be simply displayed as an image on the screen. The reference patch may also simply be a raster image or in the background of an image. The reference patch is also able to be read even when the image containing the reference patch is low resolution. Because the reference patch is encoded in a hardy and enduring manner such that even if a portion of the reference patch is corrupted or undecipherable, the reference patch can still be activated and used.

In an embodiment, the reference patch can be embedded inside of a body of an email correspondence. The user can use any electronic mail application such as Microsoft Outlook®, Gmail®, Yahoo®, etcetera. As the application is running on the first device 701, it allows the user to interact with other applications. In an embodiment, the reference patch can be embedded on a video streaming or two-way communication interface such as a Skype® video call or a Zoom® video call, among others. In an embodiment, the reference patch can be embedded in displayed data for multi-party communication on a live streaming interface such as Twitch®.

One way in which the first device 701 may embed the reference patch into the displayed data is by arranging the generated reference patch in the displayed data such as in a desired document or other media. The reference patch may include a facade of the digital content which becomes an integrated part of the displayed data. The facade can act as a visual preview to inform the user of the digital content linked to the reference patch. The facade can include, for example, a screenshot of a video to be played, a logo, an animation, or an image thumbnail, among others. The facade can be a design overlay. The design overlay can be a picture that represents the underlying digital content superimposed over the reference patch. In an embodiment, the facade can indicate the content that is represented by the reference patch. The facade can be contained within the shape of the reference patch or have a dynamic size. For example, attention of the user can be brought to the facade by adjusting the size of the facade when the reference patch is displayed on the display. The adjustment of the size of the facade can also be dynamic, wherein the facade can enlarge and shrink multiple times. By the same token, a position and rotation of the facade can also be adjusted to produce a shaking or spinning effect, for instance.

Unlike traditional means of sending displayed data, the first device 701 may not send the whole digital content with a header file (metadata) and a payload (data). Instead, the reference patch that may include a facade of the underlying digital content is placed within the displayed data. If a facade is used, it indicates to the first device 701 that the surface area can have digital content that can be accessed with selection (clicking with a mouse, touchpad, eye-gaze, eye-blinks, or via voice-command) of the facade. The digital content can also be accessed or activated automatically, e.g., when the user has the reference patch displayed on the display of the first device 701. Other symbolic means of visualization can be employed to indicate to the user that the surface area is likely to include information for obtaining digital content. For example, a highlighting effect can be applied along a perimeter of the reference patch in a pulsating pattern of highlighting intensity to bring attention to the presence of the reference patch. For example, a series of spaced dashes surrounding the reference patch and oriented perpendicular to the perimeter of the reference patch can appear and disappear to provide a flashing effect. Other means can be employed to indicate to the user that the surface area is likely to include information for obtaining digital content, such as an audio cue.

The first device 701 employs further processes before embedding the reference patch into the displayed data. These processes and schemas are further discussed in FIG. 2B.

Figure 2B:
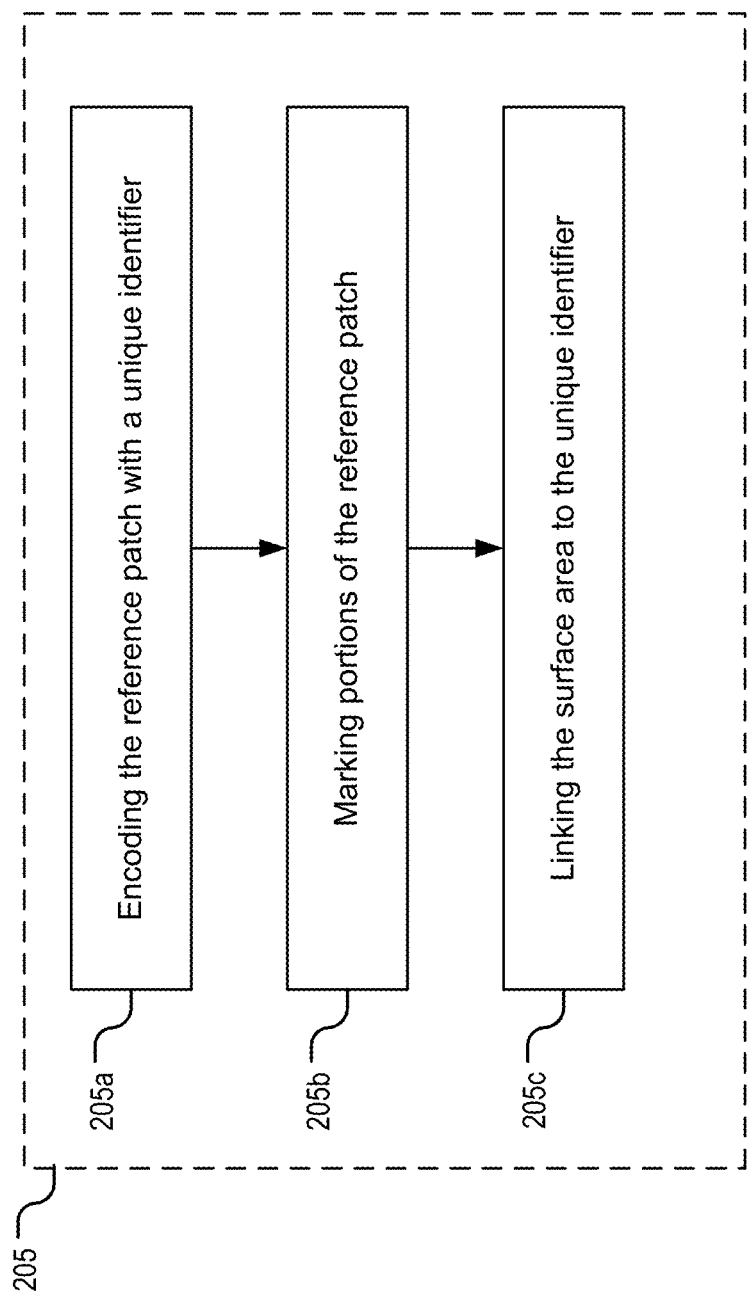
FIG. 2B is a flow chart of a sub-method of generating the reference patch, according to an exemplary embodiment of the present disclosure.

FIG. 2B is a flow chart of a sub-method of generating the reference patch, according to an embodiment of the present disclosure. The first device 701 can associate the digital content with the surface area corresponding to the reference patch (e.g., via the unique identifiers included therein) generated by the first device 701. In an embodiment, the surface area may encompass the whole of the displayed data or a portion of it.

The reference patch, which includes the unique identifiers corresponding to the surface area associated with the digital content, is then embedded into the displayed data by the first device 701. In some use cases, the displayed data including the reference patch can be sent or transmitted to a second user having the third device 702 including the same application, which then allows the second user to access information within the surface area and obtain the digital content and have it viewable on the third device 702. That is, the third device 702 can have the same displayed data overlaid with the augmenting digital content on the surface area of the display of the third device 702 in the location or locations defined by the reference patch.

In FIG. 2B, the generating device 1001 uses additional processes to effectuate generation of the reference patch which is obtained and embedded by the first device 701. In an embodiment, the generating device 1001 encodes the reference patch with the unique identifiers corresponding to the surface area in step 205*a*. The generating device 1001 can mark areas of the reference patch in step 205*b* to form the marker that, either separately or in combination, define or may be used to access the unique identifiers. The marker can take the form of patterns, shapes, pixel arrangements, or the like. In an example, the marker can have a shape that corresponds to the shape of the surface area. In an example, the marker can have a size that corresponds to the size of the surface area. In an example, the marker can have a perimeter that corresponds to the perimeter of the surface area. The marker can use any feasible schema to provide identifying information that corresponds to the surface area within parts of the displayed data. In an embodiment, the marker can incorporate hidden watermarks that are only detectable by the first device 701 and the third device 702, which have detection functionality implemented therein, for example having the application installed or the functionality built into the operating system.

The marker can incorporate patterns which can then be extracted by the first device 701. In an example, the first device 701 can perform the embedding, then send the digital content having the embedded reference patch to the third device 702. The encoding is performed by the generating device 1001 and may use any variety of encoding technologies such as the ARUCO algorithm to encode the reference patch by marking the reference patch with the marker. The first device 701 may also be used as the generating device 1001.

In an embodiment, the marker can be comprised of a set of points, equidistant from each other and/or some angle apart from a reference point, such as the center of the reference patch or represent some other fiducial points. That is, the fiducial points corresponding to the marker can provide a set of fixed coordinates or landmarks within the digital content with which the surface area can be mapped relative to the fiducial points. In an embodiment, the marker can be comprised of a set of unique shapes, wherein predetermined combinations of the unique shapes can correspond to a target surface area (or available area, or areas) for displaying the displayed data. The predetermined combinations of the unique shapes can also correspond to predetermined digital content for displaying in the surface area. The predetermined combinations of the unique shapes can also correspond to/indicate a position/location where the digital content should be displayed at the surface area relative to a portion of the surface area. A combination of the set of points and unique identifiers can be used as well.

For example, the unique identifiers can be unique shapes that correlate to predetermined digital content as well as indicating where the digital content should be overlayed on the display (the screen position) relative to a set of points marked on the reference patch. The unique identifiers can also indicate a size of the digital content to be overlayed on the display, which can be adjustable based on the size of the surface area (also adjustable) and/or the size of the display of the first device 701. The unique identifiers can be relatively invisible or undetectable to the user, but readable by the first device 701 and cover predetermined areas of the reference patch. The unique identifiers, and by extension, the marker, can have an appearance that is marginally different from an appearance of the area of the reference patch. For example, the area of the reference patch can appear white to the user and the unique identifiers can also appear white to the user but may actually have a slightly darker pixel color that can be detected and interpreted by a device, such as the first device 701. For instance, the appearance of the unique identifiers can be 0.75% darker than the white color of the area of the reference patch. Such a small difference can be identified and discerned by the first device 701 while being substantially imperceptible to the user.

In an embodiment, the area of the reference patch can be divided into predetermined shapes, for instance a set of squares, and within each square, the marker (such as a "letter") can be included. For example, there can be 16 squares. Furthermore, subsets of the set of squares can be designated to represent varying information, such as a timestamp corresponding to 8 of the squares, a domain corresponding to 5 of the squares, a version corresponding to 1 of the squares, and additional information corresponding to a remainder of the squares. An identification based on the set of squares can be, for example, an 18-character (or "letter") hexadecimal. The set of squares can further include additional subsets for a randomization factor, which can be used for calculating a sha256 hash prior to encoding the reference patch with the hash. Together, the set of squares having the marker included therein can comprise the unique identifiers.

Moreover, the generating device 1001 can also employ chroma subsampling to mark attributes represented by a particular pattern. In an embodiment, the generating device 1001 can mark parts of the reference patch with predetermined patterns of pixel luma and chroma manipulation that represent a shape, a size, or a position of the surface area for displaying the digital content. Moreover, the generating device 1001 can mark a perimeter of the reference patch with a predetermined edging pattern of pixel luma and chroma manipulation that represents a perimeter of the surface area for displaying the digital content.

The generating device 1001 can further link the surface area with unique identifiers in step 205*c*. The unique identifiers can be hashed values (such as those described above) that are generated by the generating device 1001 when the reference patch is generated (such as the one having the area of the reference patch divided into the subset of squares).

Figure 2C:
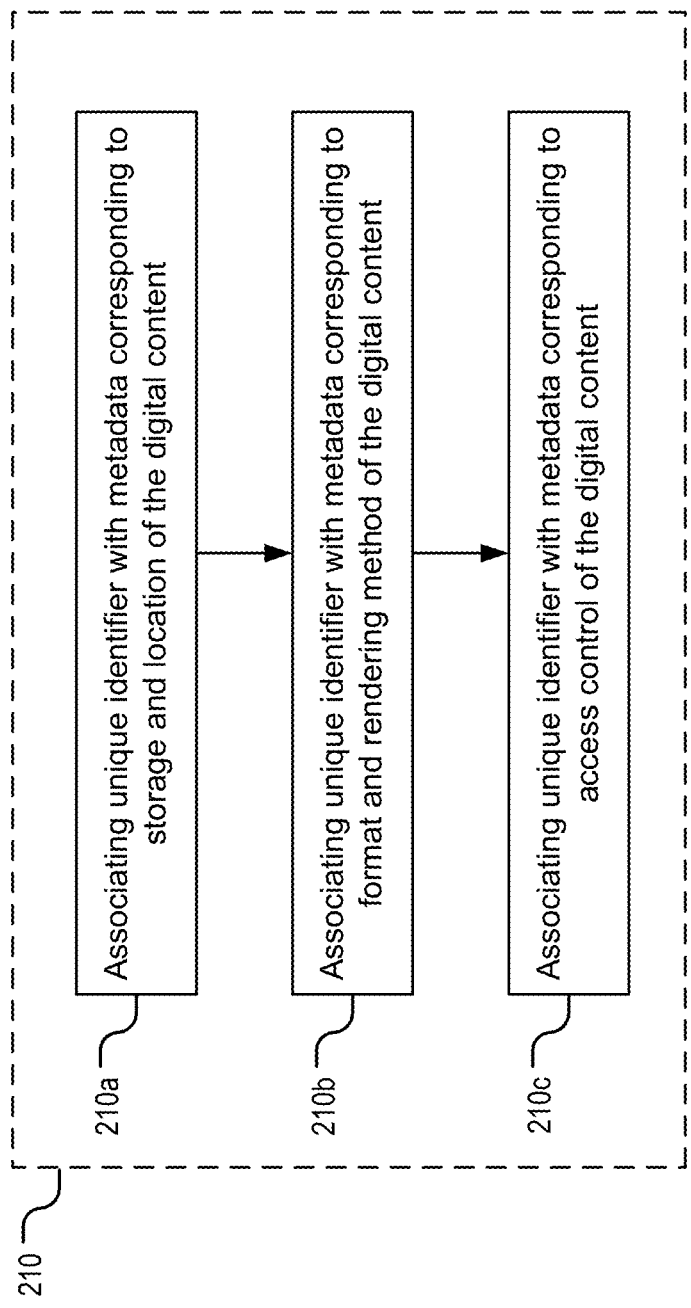
FIG. 2C is a flow chart of a sub-method of associating the surface area with digital content, according to an exemplary embodiment of the present disclosure.

FIG. 2C is a flow chart of a sub-method of associating the surface area with digital content, according to an embodiment of the present disclosure. In FIG. 2C, the generating device 1001 uses additional processes to associate the surface area with digital content. In an embodiment, the generating device 1001 can associate the unique identifiers corresponding to the surface area with metadata. In step 210*a*, the unique identifiers can be associated with metadata embodying information about the storage and location of the digital content. Moreover, in step 210*b*, the generating device 1001 can associate the unique identifier of the surface area with metadata which embodies information about the format and rendering information used for the digital content. In step 210*c*, the generating device 1001 can associate the unique identifiers of the surface area with metadata which embodies access control information of the digital content.

In an embodiment, the storage of the digital content can be on a remote server, such as the second device 850, and the location of the digital content can be the location address of the memory upon which it is stored at the remote server. The storage and location of the digital content are thus linked with the metadata that can point to where the digital content can later be obtained from. The digital content is not embedded into the displayed data. In an embodiment, the format and rendering information about the digital content is embodied in the metadata and associated with the unique identifiers. This information is helpful when the first device 701 or the third device 702 are on the receiving end of the transmitted displayed data and need to properly retrieve and process the digital content.

Moreover, in an embodiment, the access control of the digital content can also be encompassed in the metadata and associated with the unique identifiers corresponding to the surface area. The access control can be information defining whether the digital content can be accessed by certain individuals or within a certain geographical location. The access control information can define restrictions such as those placed upon time and date as to when and how long the digital content can be accessed. The access control information can define the type of display reserved for access by the first device 701. For example, a user may wish to restrict access to the digital content to certain types of devices, such as smartphone or tablets. Thus, the metadata defining a display requirement would encompass such an access control parameter.

Figure 2D:
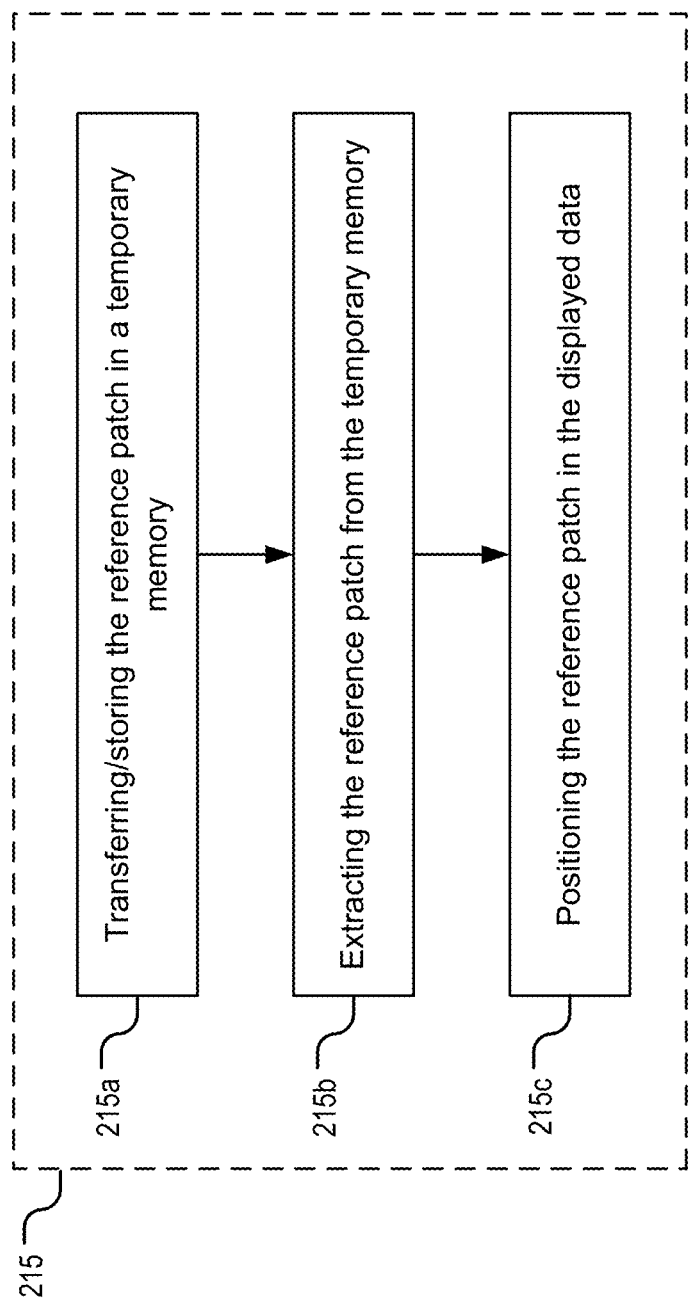
FIG. 2D is a flow chart of a sub-method of integrating the reference patch into the displayed data, according to an exemplary embodiment of the present disclosure.

FIG. 2D is a flow chart of a sub-method of integrating the reference patch into the displayed data, according to an embodiment of the present disclosure. In FIG. 2D, the generating device 1001 uses additional processes to effectuate integration of the reference patch into the displayed data. In an embodiment, the first device 701 can temporarily transfer or store the reference patch in a storage of the first device 701 in step 215a. The storage can be accessed by the first device 701 for embedding the reference patch into the displayed data at any time. The first device 701 can extract the reference patch from the storage for embedding purposes in step 215b. The first device 701 can also arrange the reference patch at a predetermined location and with a predetermined reference patch size in step 215c. The first device 701 can further embed the reference patch such that a document, for example, having the reference patch embedded therein can be sent to a recipient, for example the second user using the third device 702, where he/she can access the document using the application on the third device 702 as further described below. Again, the features of the generating device 1001 can be performed by the first device 701.

The displayed data can be output from a streaming application or a communication application with a data stream having the reference patch embedded therein. The actual digital content may not be sent along with the underlying displayed data or data stream, but only the unique identifier and/or a facade of the digital content is sent. The unique identifier and/or the underlying metadata can be stored in a cloud-based database such as MySQL which can point to the second device 850 or a cloud-based file hosting platform that ultimately houses the digital content. No limitation is to be taken with the order of the operation discussed herein; such that the sub-methods performed by the first device 701 can be carried out synchronous to one another, asynchronous, dependently or independently of one another, or in any combination. These stages can also be carried out in serial or in parallel fashion.

Figure 3A:
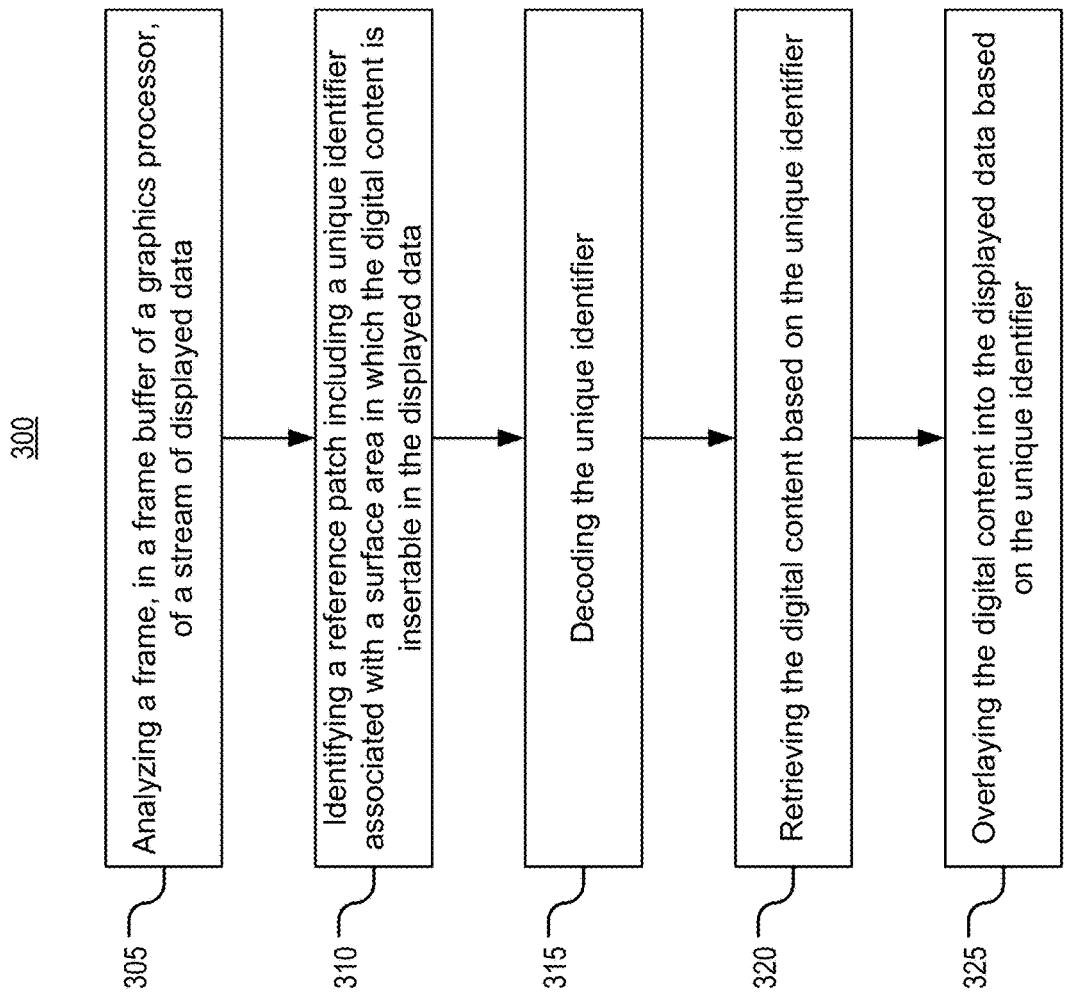
FIG. 3A is a flow chart for a method of inspecting the reference patch, according to an exemplary embodiment of the present disclosure.

FIG. 3A is a flow chart for a method 300 of identifying the reference patch included in the displayed data and overlaying the digital content into displayed data, according to an embodiment of the present disclosure. In an embodiment, in step 305, the first device 701 can inspect the stream of data being outputted by the first device's 701 video or graphics card and onto the display of the first device 701. That is, the first device 701 can access a frame buffer of the GPU and analyze, frame by frame, in the frame buffer, the outputted stream of data which can include the displayed data. In an embodiment, a frame represents a section of the stream of the displayed data that is being displayed by the first device 701. In that regard, the first device 701 can inspect the outputted stream of data. The first device 701 can achieve this by intercepting and capturing data produced from the first device 701's video card or GPU that is communicated to the first device 701's display.

In an embodiment, in step 310, the first device 701 can process attributes of each pixel included in a single frame and detect groups of pixels within that frame, which may have a known predetermined pattern of pixel luma and chroma manipulation, in order to find the reference patch.

The inspected frame by frame stream of data is also used by the first device 701 to identify the reference patch which includes the unique identifiers therein. In an embodiment, the first device 701 employs pattern recognition algorithms to detect and identify the reference patch, the perimeter of the reference patch, and/or the area of the reference patch. In an embodiment, the first device 701 detects and identifies the reference patch via the marker itself. A variety of pattern recognition algorithms can be used, such as Artificial Neural Networks (ANN), Generative Adversarial Networks (GAN), thresholding, SVM (Support Vector Machines) or any classification and pattern recognition algorithm available conducive to computer vision. Computer vision techniques may be artificial intelligence techniques that train computers to interpret and understand a visual world. In an example, the computer vision techniques may be an image recognition task, a semantic segmentation task, and the like. In a non-limiting example, the processor-based computer vision operation can include sequences of filtering operations, with each sequential filtering stage acting upon the output of the previous filtering stage. For instance, when the processor (processing circuitry) is/includes a GPU, these filtering operations are carried out by fragment programs.

In another example, the computer vision techniques may be a processor-based computer vision technique. In an embodiment, the first device 701 can look for predetermined or repeatable patterns within the frame which indicates the presence of the reference patch. In an embodiment, the first device 701 can identify the reference patch based on a confidence level, the confidence level being high when the predetermined pattern of pixel luma and chroma manipulation and the predetermined edging pattern of pixel luma and chroma manipulation are detected in the reference patch. The confidence level can be lower when one or neither of the predetermined patterns is/are detected.

According to an embodiment, in the event that an input to the operation is an image, the input images can be initialized as textures and then mapped onto quadrilaterals. By displaying these quadrilaterals in appropriately sized windows, a one-to-one correspondence of image pixels to output fragments can be ensured. Similarly, when the input to the operation is an encoded image, a decoding process may be integrated into the processing steps described above. A complete computer vision algorithm can be created by implementing sequences of these filtering operations. After the texture has been filtered by the fragment program, the resulting image is placed into texture memory, either by using render-to-texture extensions or by copying the frame buffer into texture memory. In this way, the output image becomes the input texture to the next fragment program. This creates a pipeline that facilitates the entire computer vision algorithm. However, often a complete vision algorithm may require operations beyond filtering. For example, summations are common operations. Furthermore, more-generalized calculations, such as feature tracking, can also be mapped effectively onto graphics hardware.

In an embodiment, the reference patch can be identified by use of edge detection methods. In particular, edge detection can be used for the perimeter of the reference patch having a predetermined pattern (the predetermined edging pattern). In an example, the edge detection method may be a Canny edge detector. The Canny edge detector may run on the GPU. In one instance, the Canny edge detector can be implemented as a series of fragment programs, each performing a step of the algorithm.

In an embodiment, the identified reference patch can be tracked from frame to frame using feature vectors. Calculating feature vectors at detected feature points is an operation in computer vision. A feature in an image is a local area around a point with some higher-than-average amount of uniqueness. This makes the point easier to recognize in subsequent frames of video. The uniqueness of the point is characterized by computing a feature vector for each feature point. Feature vectors can be used to recognize the same point in different images and can be extended to more generalized object recognition techniques.

Feature detection can be achieved using methods similar to the Canny edge detector that instead search for corners rather than lines. If the feature points are being detected using sequences of filtering, the GPU can perform the filtering and read back to the CPU a buffer that flags which pixels are feature points. The CPU can then quickly scan the buffer to locate each of the feature points, creating a list of image locations at which feature vectors on the GPU will be calculated.

In step 315, the first device 701 can decode the encoded data of the unique identifiers from the area of the reference patch, wherein the unique identifiers correspond to the surface area. The unique identifiers can be hashed values that could have been generated beforehand by the first device 701.

In step 320, the first device 701 can use the unique identifiers to link the surface area with the digital content using metadata and retrieve the digital content based on the unique identifiers.

In step 325, the first device 701 can overlay the digital content onto the surface area of the displayed data based on the unique identifiers.

Again, the method of identifying the reference patch included in the displayed data and augmenting the displayed data is described as performed by the first device 701, however, the second device 850 can instead perform the same functions.

Figure 3B:
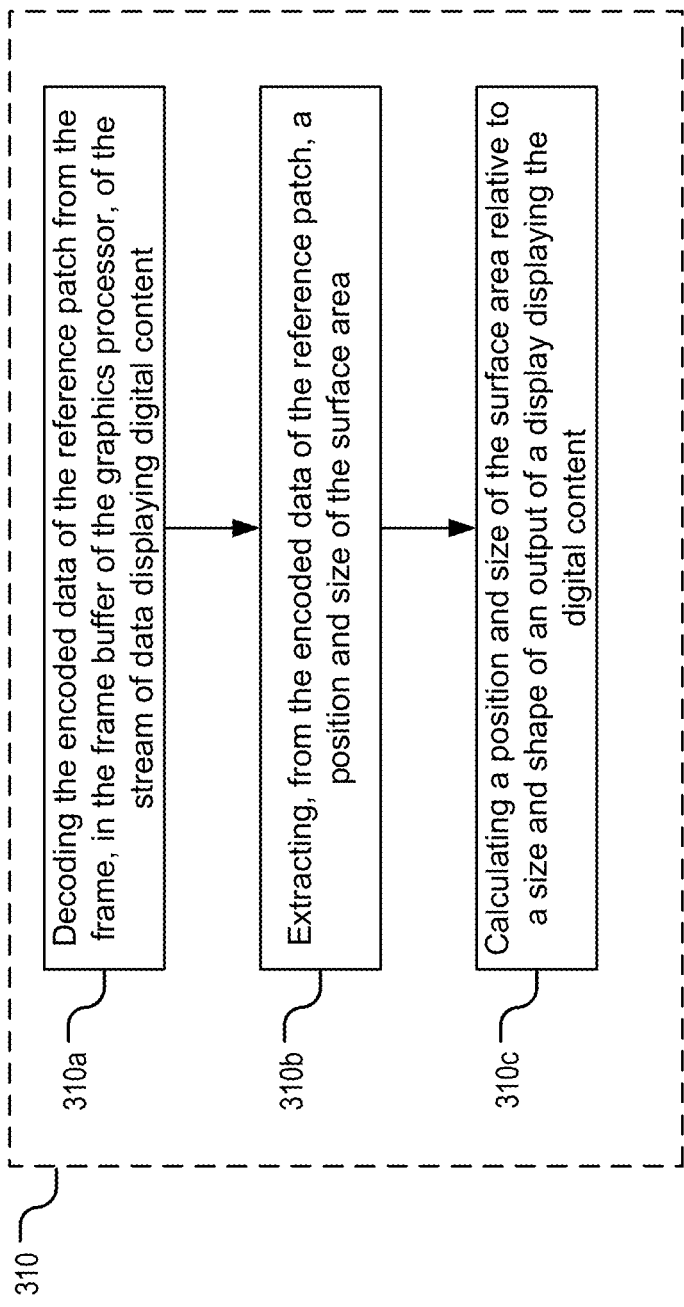
FIG. 3B is a flow chart of a sub-method of identifying the reference patch with unique identifiers corresponding to the surface area from the stream of data, according to an exemplary embodiment of the present disclosure.

In an embodiment, the first device 701 identifies the surface area corresponding to the reference patch by employing further processes to process the frames. To this end, FIG. 3B is a flow chart of a sub-method of identifying the reference patch with the unique identifiers corresponding to the surface area from the stream of data, according to an embodiment of the present disclosure.

In step 310a, the first device 701 can decode the encoded reference patch from the frame. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

In step 310b, the first device 701 can also extract attributes of the surface area from the reference patch. In an embodiment, the position, size, shape, and perimeter of the surface area are extracted, although other parameters can be extracted as well. Other parameters include boundary lines, area, angle, depth of field, distance, ratio of pairs of points, or the like. In an embodiment, where shape and perimeter are designated as the attributes, the first device 701 makes determinations of size, shape, and perimeter and outputs that result. Specifically, the size or shape of the surface area can be determined by evaluating a predetermined or repeatable pattern of pixel luma and chroma manipulation in the reference patch. The predetermined pattern can be marked on, within the area, or outside of the area of the reference patch. The predetermined pattern can correspond to the size or shape of the surface area. The predetermined pattern can correspond to the size or shape of the digital content. The perimeter of the surface area can also be determined by evaluating a predetermined edging pattern of pixel luma and chroma manipulation. The predetermined edging pattern can be marked on, within the area, or outside of the area of the reference patch. That is, the predetermined edging pattern of the refence patch can correspond to the perimeter of the surface area. The predetermined edging pattern of the refence patch can correspond to the perimeter of the digital content.

In step 310c, the first device 701 can also calculate a position and size of the surface area relative to the size and shape (dimensions) of the output signal from the display that is displaying the displayed data. In an embodiment, the calculating of the size, relative to the size and shape of the outputted signal from the display, includes determining the size of the surface area by inspecting a furthest measured distance between the edges of the surface area. Furthermore, the calculating of a location of the surface area, relative to the size and shape of the outputted signal from the display, includes determining the location of the surface area relative to the size and shape of the displayed data outputted through the display. This includes calculating the distance between the outer edges of the surface area and the inner edges of the displayed data being outputted by the display. The determined size and location of the surface area can be outputted as a result. Notably, prior to overlaying the digital content into the displayed data, the first device 701 can adjust, based on the predetermined pattern and the predetermined edging pattern, the size and perimeter of the digital content for displaying in the display of the first device 701. For example, the size and perimeter of the digital content for displaying in the display of the first device 701 can be scaled based on the size and perimeter of the surface area and/or the size of the display.

The first device 701 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

In an embodiment, the reference patch itself can be used as the reference for which the digital content is displayed on the surface area. In one example, the location at which to display the digital content in the surface area can be determined relative to the location of the reference patch on the displayed data. In one example, the size of the surface area can be determined relative to the size of the reference patch on the displayed data. In an example employing a combination of the two properties of the reference patch, the reference patch displayed in the displayed data on a smart phone having a predetermined size and a surface area can be scaled relative to the predetermined size of the display of the smart phone. This can be further adjusted when the reference patch in the same displayed data is displayed on a desktop monitor, such that the predetermined size of the reference patch in the displayed data displayed on the desktop monitor is larger and thus the size of the surface area can be scaled to be larger as well. Furthermore, the location of the surface area can be determined via a function of the predetermined size of the reference patch. For example, the location at which to display the digital content in the surface area can be disposed some multiple widths laterally away from the location of the reference patch as well as some multiple heights longitudinally away from the location of the reference patch. As such, the predetermined size of the reference patch can be a function of the size of the display of the first device 701. For example, the predetermined size of the reference patch can be a percentage of the width and height of the display, and thus the location and the size of the surface area are also a function of the width and height of the display of the first device 701.

In an embodiment, the first device 701 can determine an alternative location at which to display the digital content based on behaviors of the user. For example, the first device 701 can compare the encoded data corresponding to the location at which to display the digital content in the surface area to training data describing movement and focus of the user's eyes while viewing the displayed data. Upon determining the location at which to display the digital content in the surface area (as encoded in the reference patch) is not the same as the training data, the first device 701 can instead display the digital content at the location described by the training data as being where the user's eyes are focused in the displayed data at a particular time. For example, the user's eyes may be predisposed to viewing a bottom-right of a slide in a slide deck. The first device 701 can decode the reference patch and determine the digital content is to be displayed in a bottom-left of the slide deck. The training data can indicate that, for example, the user's eyes only focus on the bottom-left of the slide 10% of the time, while user's eyes focus on the bottom-right of the slide 75% of the time. Thus, the first device 701 can then display the digital content in the bottom-right of the slide instead of the bottom-left. The training data can also be based on more than one user, such as a test population viewing a draft of the slide deck. For example, the training data can be based on multiple presentations of the slide deck given to multiple audiences, wherein eye tracking software determines the average location of the audience's focus on each of the slides.

In an embodiment, the first device 701 employs other processes to associate the unique identifiers with the digital content. To this end, FIG. 3C is a flow chart of a sub-method of associating the unique identifiers with digital content, according to an embodiment of the present disclosure. In step 320*a*, the first device 701 can send the unique identifiers to the second device 850 and the second device 850 can retrieve metadata that describes the digital content, the digital content being associated with the surface area through the unique identifiers. This can be done by querying a remote location, such as a database or a repository, using the unique identifiers of the surface area as the query key. In an embodiment, the first device 701 sends the unique identifiers to the second device 850 and the second device 850 associates the unique identifier of the reference patch to corresponding digital content based on the metadata. The metadata associated with the surface area's unique identifier can be transmitted to the first device 701 with the augmentation content.

In step 320*b*, the first device 701 can assemble the digital content that is associated with the surface area's unique identifier. The assembly can entail loading the necessary assets for assembling the digital content. In an embodiment, this can entail loading manipulation software or drivers in order to enable the first device 701 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 320*c*, the first device 701 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 701. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 701 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 3A, in step 325, the first device 701 can carry on the processes of overlaying the surface area with the digital content into the displayed data in accordance with the surface area, the position, and the size identified by the unique identifier. The first device 701 can determine or adjust the size and location of the assembled digital content on the surface area relative to the size and shape of the displayed data being outputted by the display. Then, the first device 701 can render the associated digital content (or the assembled individual portions) over the surface area's shape and perimeter using the size and location information. Thus, the digital content is superimposed on top of the surface area.

The first device 701 can continuously monitor changes that are taking place at the end user's device (such as the second device 702 of the second user) to determine whether the reference patch and/or the surface area has moved or been transformed in any way. Thus, the first device 701 can continuously inspect subsequent frames of the stream of the data (for example, every 1 ms or by reviewing every new frame), displaying the displayed data, to determine these changes. The first device 701 can further continuously decode the reference patch's data from the identified reference patch. Then the first device 701 can continuously extract attributes from the data, the attributes being of size, shape, and perimeter and comparing those changes between the current frame and last frame. Further, the first device 701 can continuously calculate the size and location of the surface area and compare changes between the size and location of the surface area from the current and the last frame and then continuously overlay the digital content on the surface area by incorporating the changes in the reference patch's attributes and the changes in the size and location of the surface area. As stated above, when the user manipulates his/her display device by scaling, rotating, resizing or even shifting the views from one display device and onto another display device, the first device 701 can track these changes and ensure that the digital content is properly being superimposed onto the surface area.

An illustrative example will now be discussed: a scenario where a user (for example, a user at the first device 701) receives (from another device such as the third device 702) an email with the embedded reference patch in the body of the email or as an attached document. The reference patch within the displayed data (email) can show a facade of the digital content or the reference patch. The application on the first device 701 can scan the display to find the reference patch and the surface area and the attributes within the displayed data as it is being displayed. Furthermore, the first device 701 can access the digital content using the unique identifier and metadata and prepare it for overlaying. At which point, the user (i.e., the recipient) can select the digital content by various ways such as by clicking on the digital content's facade or the surface area, or otherwise indicating that it intends to access the digital content.

Thereafter, the digital content can be retrieved from the second device 850 using the unique identifier and the metadata saved within a database that directs the second device 850 to where the digital content is saved and can be obtained. That is, the second device 850 can determine the digital content corresponding to the derived unique identifier and send the digital content corresponding to the unique identifier (and the metadata) to the first device 701. Then, the first device 701 can superimpose (overlay) the digital content on the surface area. While the digital content is being received and overlayed on the surface area, the first device 701 can continually monitor the location, size and/or shape of the reference patch and/or the surface area to determine movement and transformation of the reference patch and/or the surface area. If the user has moved the location of the reference patch and/or the surface area, or has resized or manipulated the screen for whatever purpose, the new location, shape and/or size information of the reference patch and/or the surface area is determined in order to display the digital content properly within the bounds of the surface area. Thus, the digital content moves with the displayed data as the displayed data is moved or resized or manipulated.

In an embodiment, a user that has received the displayed data embedded with the reference patch can access the digital content on his/her first device 701, as described above. The user may want to transfer the ongoing augmenting experience from the first device 701 to another device, such as the device 70n, in a seamless fashion. In that scenario, the user is able to continue the augmenting experience on his/her smartphone, smartwatch, laptop computer, display connected with a webcam, and/or tablet pc. The user therefore can capture the embedded reference patch and therefore the encoded attributes, as the digital content is being accessed and overlaid unto the surface area. The user can capture the embedded reference patch by taking a picture of it or acquiring the visual information using a camera of the third device 702 as mentioned above.

Assuming the user also has the functionality included or the application installed or running on the device 70n, the device 70n would recognize that an embedded reference patch and encoded unique identifiers are in the captured image/video stream. Once the surface area has been determined and the reference patch decoded, the digital content can be obtained from the second device 850, using the unique identifiers and the metadata and then overlaid on the surface area within the displayed data displayed on the device 70n. In an embodiment, as soon as the device 70n superimposes the digital content onto the surface area, the second device 850 or the backend determines that the stream has now been redirected onto the device 70n and thus pushes a signal to the first device 701 to stop playing the digital content on the first device 701. The device 70n that is overlaying the digital content therefore resumes the overlaying at the very same point that the first device 701 stopped overlaying the digital content (for instance, when the content is a video for example). Thus, the user is able to handoff the digital content from one device to another without noticing delay or disruption in the augmenting experience.

In another illustrative example of content augmentation, the user can be browsing a page of a website. The webpage may be dedicated to discussions of strategy in fantasy football, a popular online sports game where users manage their own rosters of football players and points are awarded to each team based on individual performances from each football player on the team. After reading the discussion on the website page, the user may wish to update his/her roster of football players. Traditionally, the user would be required to open a new window and/or a new tab and then navigate to his/her respective fantasy football application, to his/her team, and only then may the user be able to modify his/her team. Such a digital user experience can be cumbersome. With augmentation, however, the user may not need to leave the original webpage since a reference patch corresponding to a fantasy football augmentation (i.e., fantasy football digital content for overlaying on the displayed website page) may be positioned within the viewable area of the website page. The corresponding digital content may be, for instance, an interactive window provided by a third-party fantasy football application that allows the user to modify his/her roster without leaving the original web site. Thus, instead of navigating to a different web site and losing view of the informative fantasy football discussion, the user can simply interact with the digital content that is being overlaid on the displayed data.

Figure 4A:
FIG. 4A is an illustration of a display, according to an exemplary embodiment of the present disclosure.
Figure 4B:
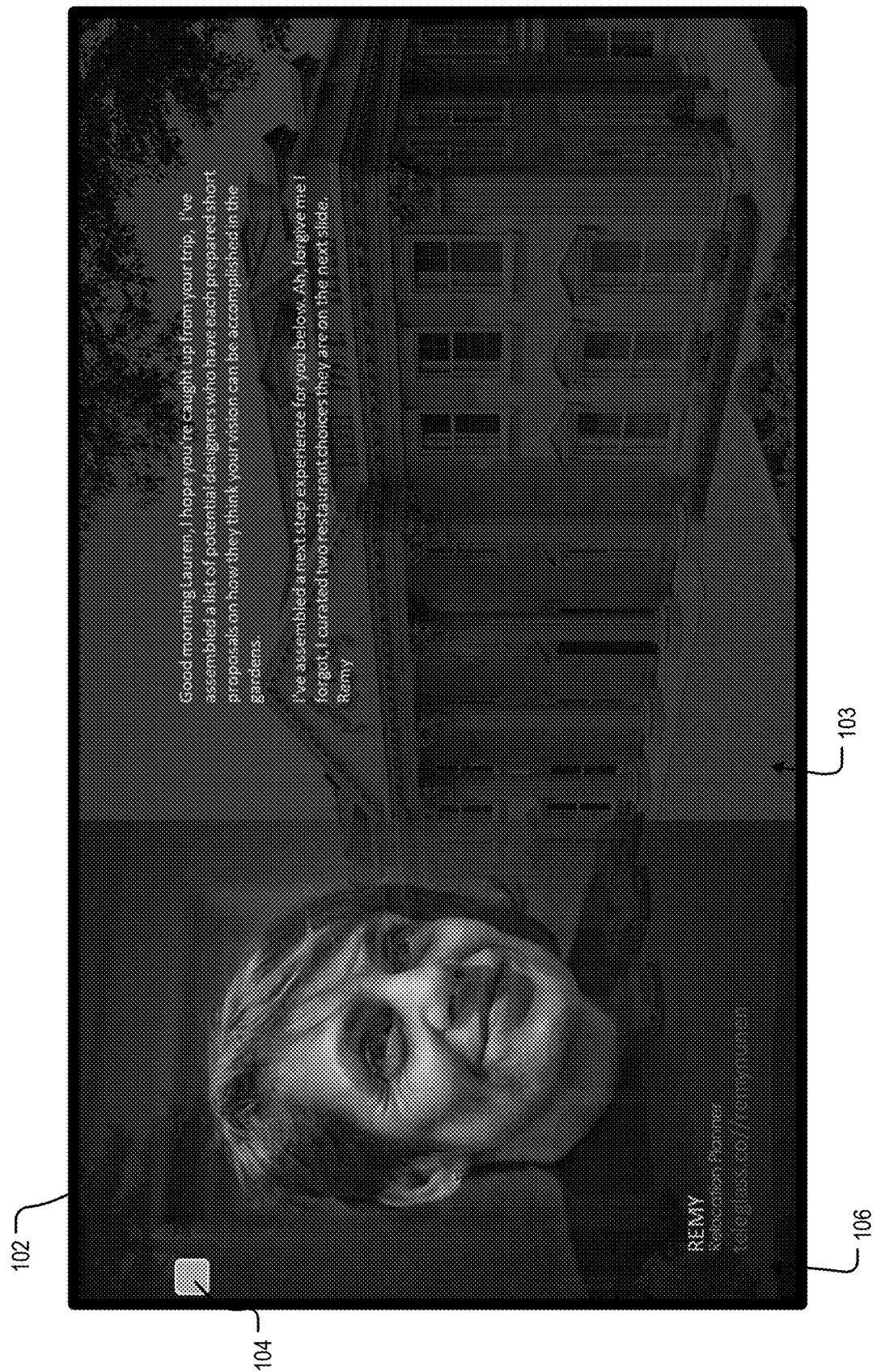
FIG. 4B is an illustration of a reference patch within a frame of a display, according to an exemplary embodiment of the present disclosure.
Figure 4C:
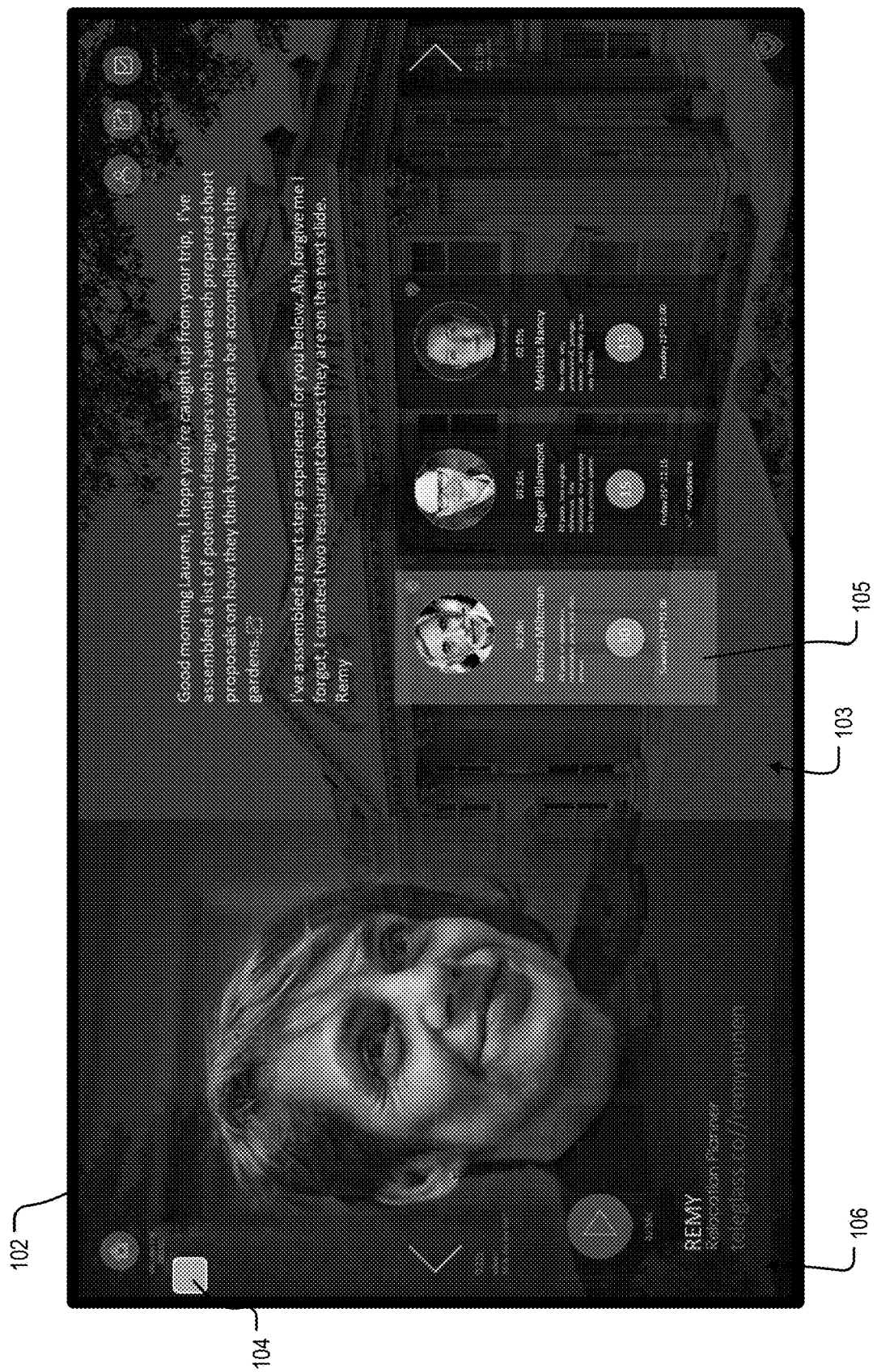
FIG. 4C is an illustration of an augmentation within a frame of a display, according to an exemplary embodiment of the present disclosure.

In yet another illustrative example of content augmentation, as will be described with reference to FIG. 4A through FIG. 4C, the displayed data is a slide deck. The slide deck may be generated by a concierge-type service that seeks to connect a client with potential garden designers. As in FIG. 4A, the slide deck may be presented to the client within a viewable area 103 of a display 102 of the first device 701. The presently viewable content of the slide deck within the viewable area 103 of the display 102 may be a current frame of display data 106. Traditionally, the slide deck may include information regarding each potential garden designer and may direct the client to third-party applications that allow the client to contact each designer. In other words, in order to connect with one or more of the potential garden designers, the client, traditionally, may need to exit the presentation and navigate to a separate internet web browser in order to learn more about the garden designers and connect with them. Such a digital user experience can be also cumbersome.

With augmentation, however, the client need not leave the presentation in order to set up connections with the garden designers. For instance, as shown in FIG. 4B, a reference patch 104 can be positioned within the slide deck to be in the current frame 106 and viewable within the viewable area 103 of the display 102 at an appropriate moment. As shown in FIG. 4C, the reference patch 104 may correspond to digital content 105 (i.e., one or more augmentations) and, when the reference patch 104 is visible to/detectable by the first device 701, the digital content 105 is retrieved and displayed by the first device 701 at the corresponding surface area. The digital content 105 can include, as shown in FIG. 4C, interactive buttons, images, videos, windows, and icons, among others, that allow the client to interact with the displayed data and to, for instance, engage with the garden designers without leaving the presentation. In an example, the interactive digital content 105 may allow for scheduling an appointment with a given garden designer while still within the slide deck.

As previously noted, the above-described augmentations are particularly relevant to environments where the underlying content is static. Static content may include textual documents or slide decks. Often, the static content is stored locally in the electronic device. Due to its nature, the static content is not capable of being dynamically adjusted according to complex user interactions, in real-time, during the user experience.

Such a dynamic environment includes one where, for instance, a video conversation is occurring. A first participant of the video conversation may share their screen with a second participant of the video conversation and wish to remotely-control the digital content on a display of a device of the second participant. By including the reference patch within the displayed data that is being shared, which may be the video itself or another digital item, where sharing the displayed data includes transmitting the displayed data over a communication network from the first participant to the second participant, the second participant may be able to experience the digital content when the device of the second participant receives the transmitted displayed data and processes it for display to the user.

Generally, and as introduced in the above example of a dynamic environment, the reference patch 104 can be inserted into displayed data displayed on a first computer or the first device 701. The display of the first device 701 can be streamed to a second computer or the third device 702. In an example, the third device 702 decodes the streamed display of the first device 701 and, based on the identified presence of the reference patch 104, can locally-augment the display of the third device 702 to overlay the intended digital content on the streamed display of the first device 701. The design and the arrangement of the digital content can be provided relative to the reference patch 104 placed into the displayed data on the first device 701. The digital content can include objects to be displayed and may be configured to display different subsets of objects based on interactions of a user with the digital content. The objects, therefore, may be interactive.

In an example of a live video stream, a user may be a yoga instructor teaching a remote yoga class by Microsoft Teams. Each participant in the class may be able to view the yoga instructor via their respective devices, wherein the 'live streamed' video includes video of the yoga instructor guiding the participants of the class through the techniques. At the end of class, the yoga instructor may wish to receive payment from each of the participants. The instructor may open a cloud-based slide which, for instance, may have the reference patch 104, therein. The reference patch 104 may be configured to augment a pay button relative to a position of the reference patch 104 on a device display of each participant. Upon screen sharing the cloud-based slide with the participants in the class, each participant's device receives the transmitted displayed data and processes the displayed data for display. During processing, each device observes and identifies the reference patch 104 within the displayed data. Accordingly, each device can generate a local augmentation (i.e., retrieve and display the corresponding digital content) on a respective display in order for the participant to be able to enter the payment information and pay for the remote yoga class. The digital content may be generated within the live video stream.

In another example of a live video stream, and as will be described with reference to FIG. 5A through FIG. 5K, a user may be a bank teller discussing a new savings account with a potential bank member. The bank teller may initiate a video call with the potential bank member. The bank teller may include, within a video stream being transmitted from the bank teller to the potential bank member, the reference patch 104. The transmitted video stream may include a video feed generated by a camera associated with a device (the first device 701) of the bank teller. Accordingly, the transmitted video stream may include an image of, for instance, a face of the bank teller and the reference patch 104 therein. Upon receiving the video stream, a device of the potential bank member (the third device 702) may process the video stream and identify the reference patch 104. Accordingly, the third device 702 of the potential bank member may generate a local augmentation (i.e., retrieve and display the corresponding digital content) on the respective display of the third device 702 in order to allow the potential bank member to be able to interact with the bank teller and establish the new savings account. The digital content may appear on top of the live video stream of the bank teller. The digital content can include a number of objects to be displayed and may be configured to display different subsets of objects based on interactions of a user with the digital content, the objects being interactive in some cases. This allows for the digital content to be updated in response to user interactions.

For instance, updated digital content may reflect a step by step process of opening the new savings account, the digital content being updated at each step according to the interactions of the potential bank member. First, the digital content may require confirmation of identity, which can include instructing the potential bank member in exhibiting his/her driver's license such that an image of the driver's license can be obtained. The confirmation of identity may also include instruction related to and acquisition of an image of the potential bank member. Next, the digital content may present a banking contract to the potential bank member, the potential bank member then being able to review and sign the banking contract. Lastly, the digital content can request the potential bank member provide verbal confirmation of the approval of the bank contract. Each of these steps can be associated with a same reference patch 104 corresponding to digital content that guides the 'new' bank member along the account setup process.

Figure 5A:
FIG. 5A is an illustration of an implementation of a method, according to an exemplary embodiment of the present disclosure.

With reference now to FIG. 5A through FIG. 5K, an exemplary implementation of a live stream video augmentation will be described in more detail. In the exemplary implementation, a bank teller 521 (e.g., on the first device 701) discusses a new savings account with a potential bank member 531 (e.g., on the third device 702). The bank teller 521 may initiate the video call with the potential bank member 531. The bank teller 521 may include, within a video stream being transmitted from the bank teller to the potential bank member 531, the reference patch 104. In the example of FIG. 5A, the reference patch 104 is a bank logo (in this case, a Chase logo). The transmitted video stream may include a video feed 506 generated by a camera associated with the first device 701 of the bank teller 521. Accordingly, the transmitted video stream may include an image of, for instance, a face of the bank teller 521 and the reference patch 104 therein. Upon receiving the video stream, the third device 702 of the potential bank member 531 may process the video stream and identify the reference patch 104 within this video stream.

Accordingly, the third device 702 of the potential bank member 531 may obtain rendering instructions for digital content 541 (i.e., an augmentation) corresponding to the reference patch 104 and then retrieve and display the digital content 541 at/on the surface area on a respective display of the third device 702 in order to allow the potential bank member 531 to be able to interact with the bank teller 521 and establish the new savings account. The digital content 541 may be generated on top of the live video stream 506 of the bank teller 521. The digital content 541 can include a number of objects 551 to be displayed and may be configured to display different subsets of objects based on interactions of the potential bank member 531 with the digital content 541, the objects 551 being interactive in some cases. This allows for the digital content 541 to be updated in response to user interactions. Note that the digital content can be retrieved from a server such as the second device 850.

Figure 5B:
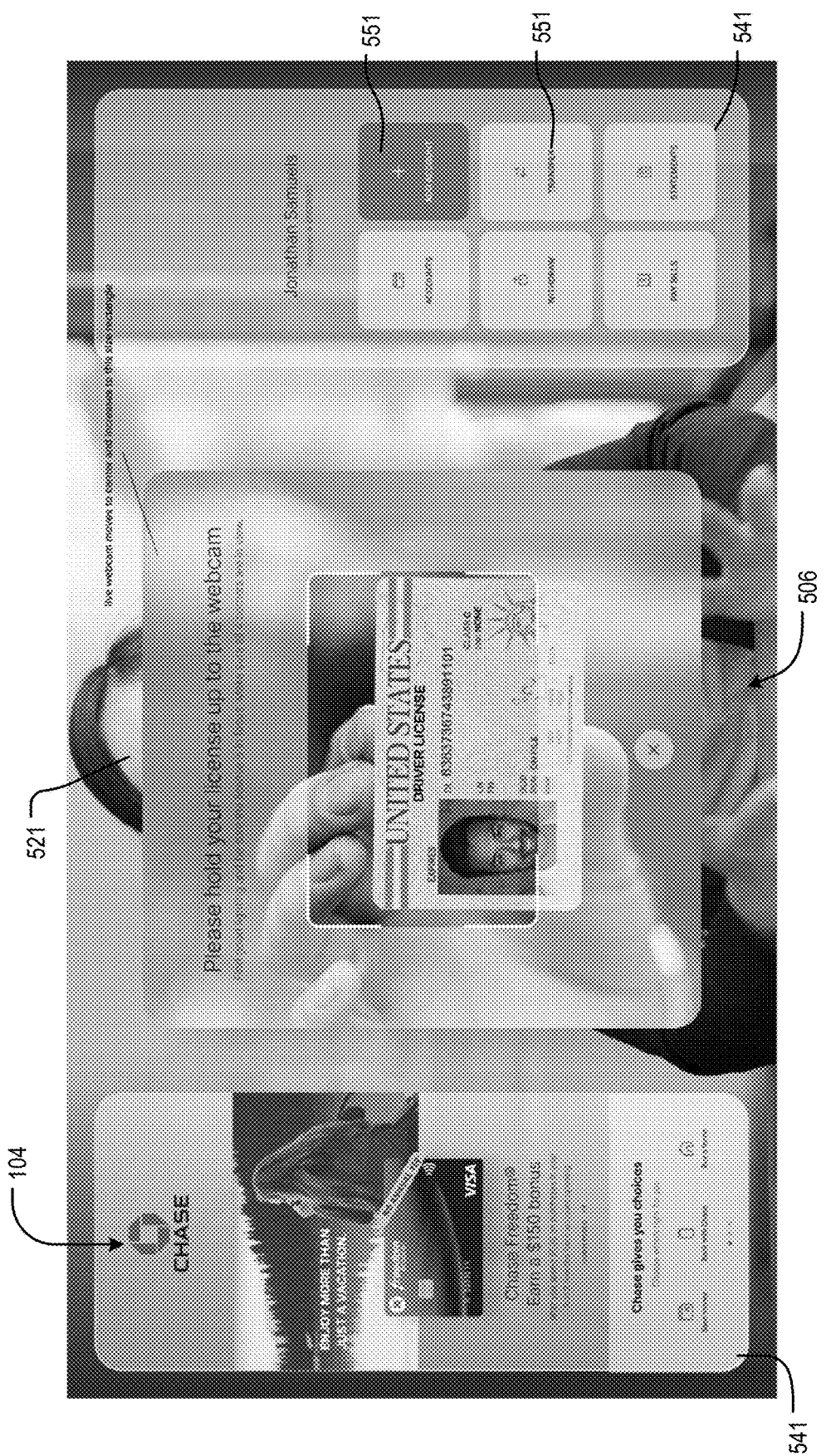
FIG. 5B is an illustration of an implementation of a method, according to an exemplary embodiment of the present disclosure.
Figure 5D:
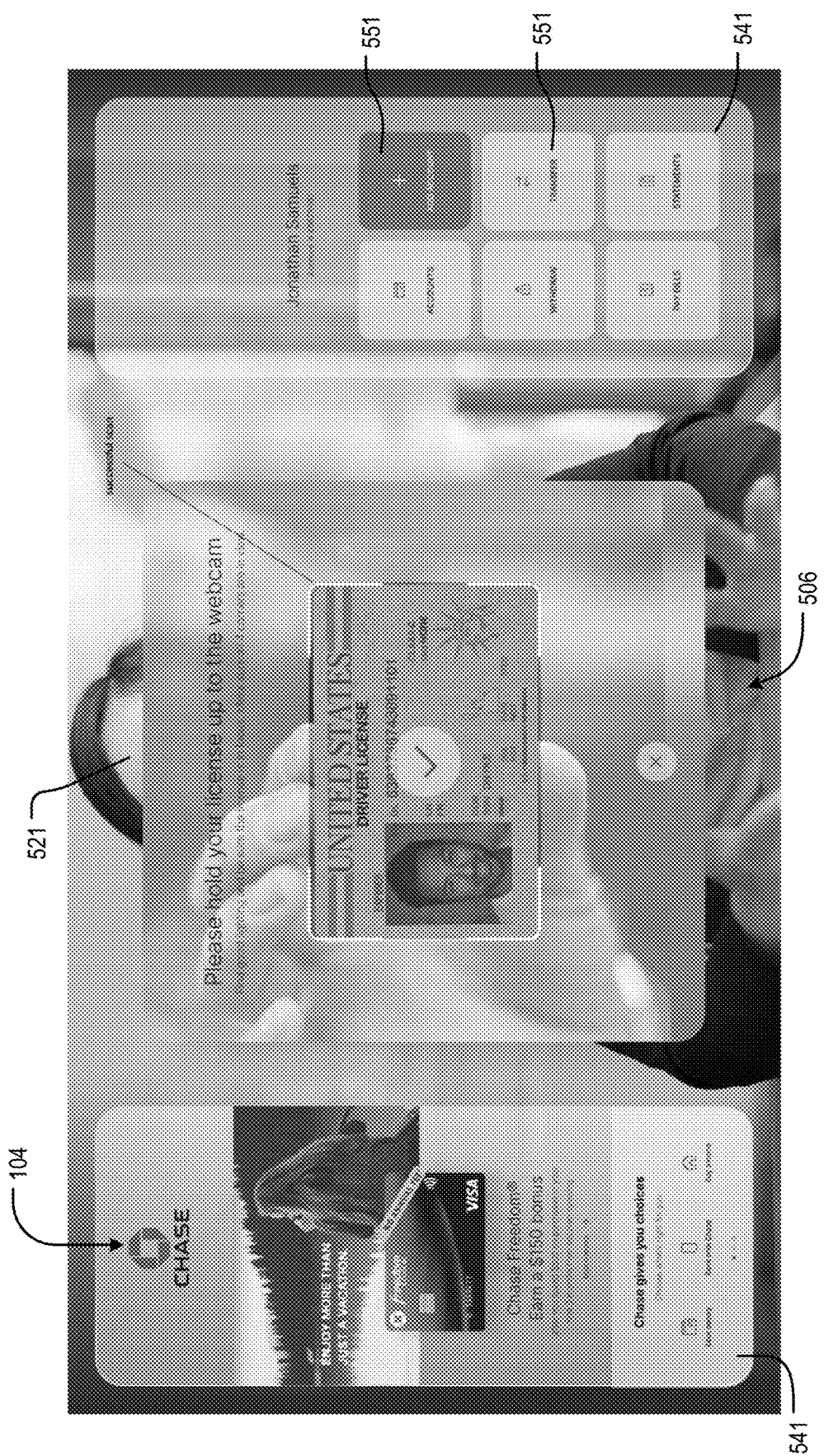
FIG. 5D is an illustration of an implementation of a method, according to an exemplary embodiment of the present disclosure.
Figure 5E:
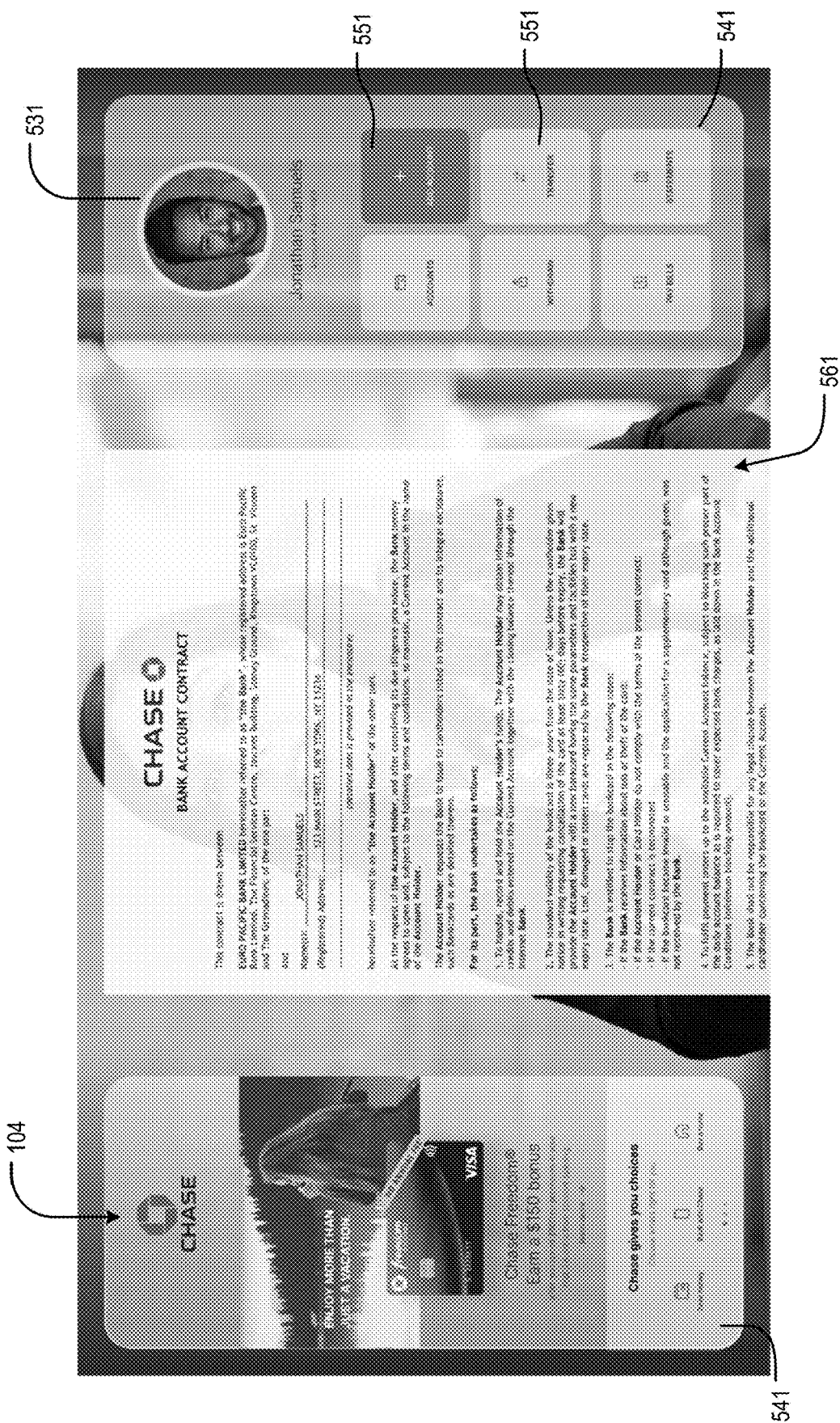
FIG. 5E is an illustration of an implementation of a method, according to an exemplary embodiment of the present disclosure.
Figure 5F:
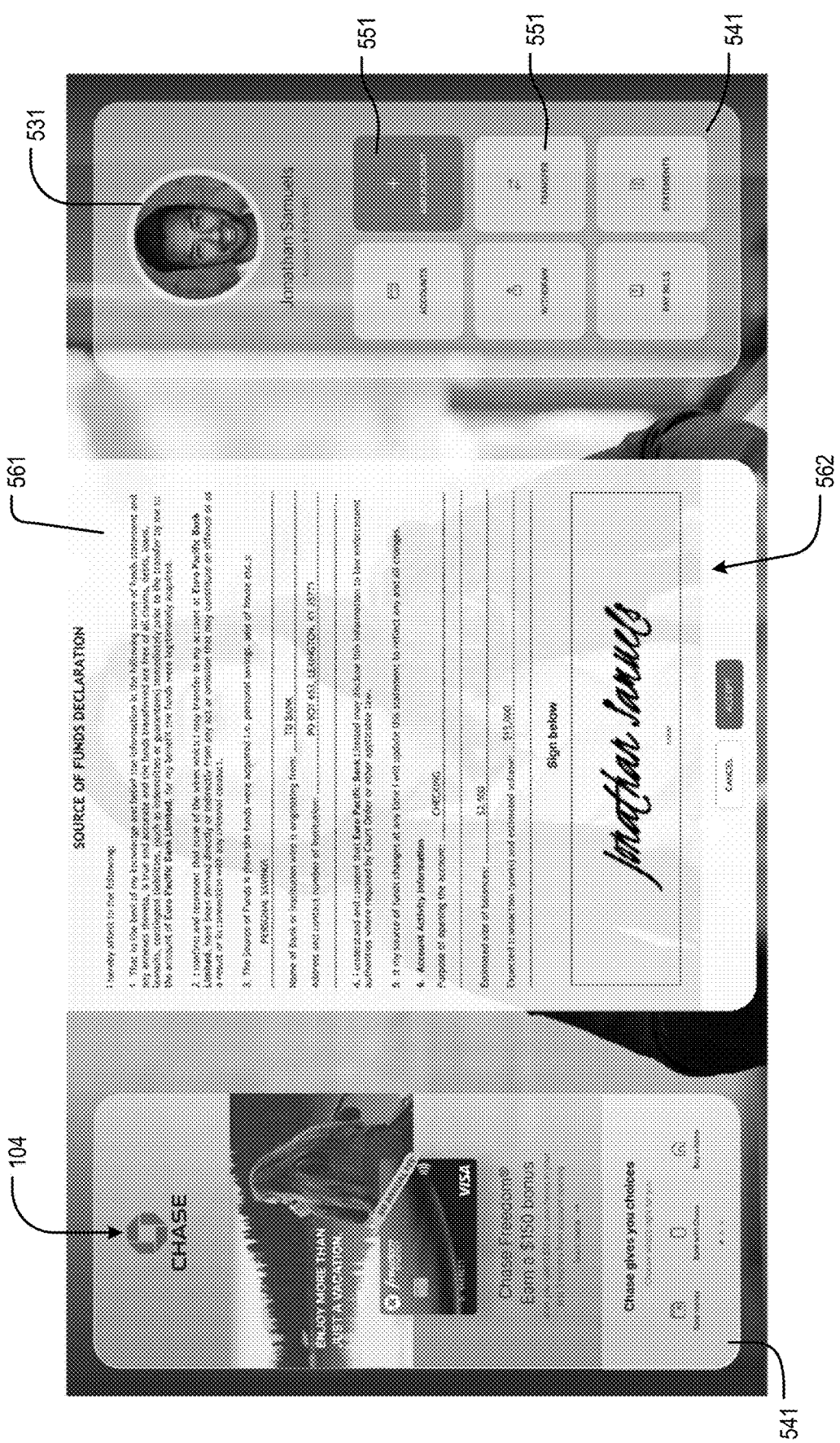
FIG. 5F is an illustration of an implementation of a method, according to an exemplary embodiment of the present disclosure.

For instance, updated digital content may reflect the step by step process of opening the new savings account, the digital content being updated at each step according to the interactions of the potential bank member. With reference to FIG. 5B through FIG. 5D, the digital content 541 may first require confirmation of the identity of the potential bank member 531. This can include instructing the potential bank member 531 to exhibit his/her driver's license such that an image of the driver's license can be obtained. As shown in FIG. 5C, a guide can be deployed and a confirmation graphic can be displayed, as in FIG. 5D, when an adequate image of the driver's license has been obtained. The confirmation of identity may also include instruction related to and acquisition of an image of the potential bank member 531. Next, the digital content 541 may present a banking contract 561 to the potential bank member 531, as shown in FIG. 5E. As shown in the FIG. 5F, the potential bank member 531 may then review and provide a signature 562 if the banking contract 561 is approved. Lastly, the digital content 541 can request the potential bank member 531 to provide verbal confirmation of the approval of the banking contract 561.

Figure 5G:
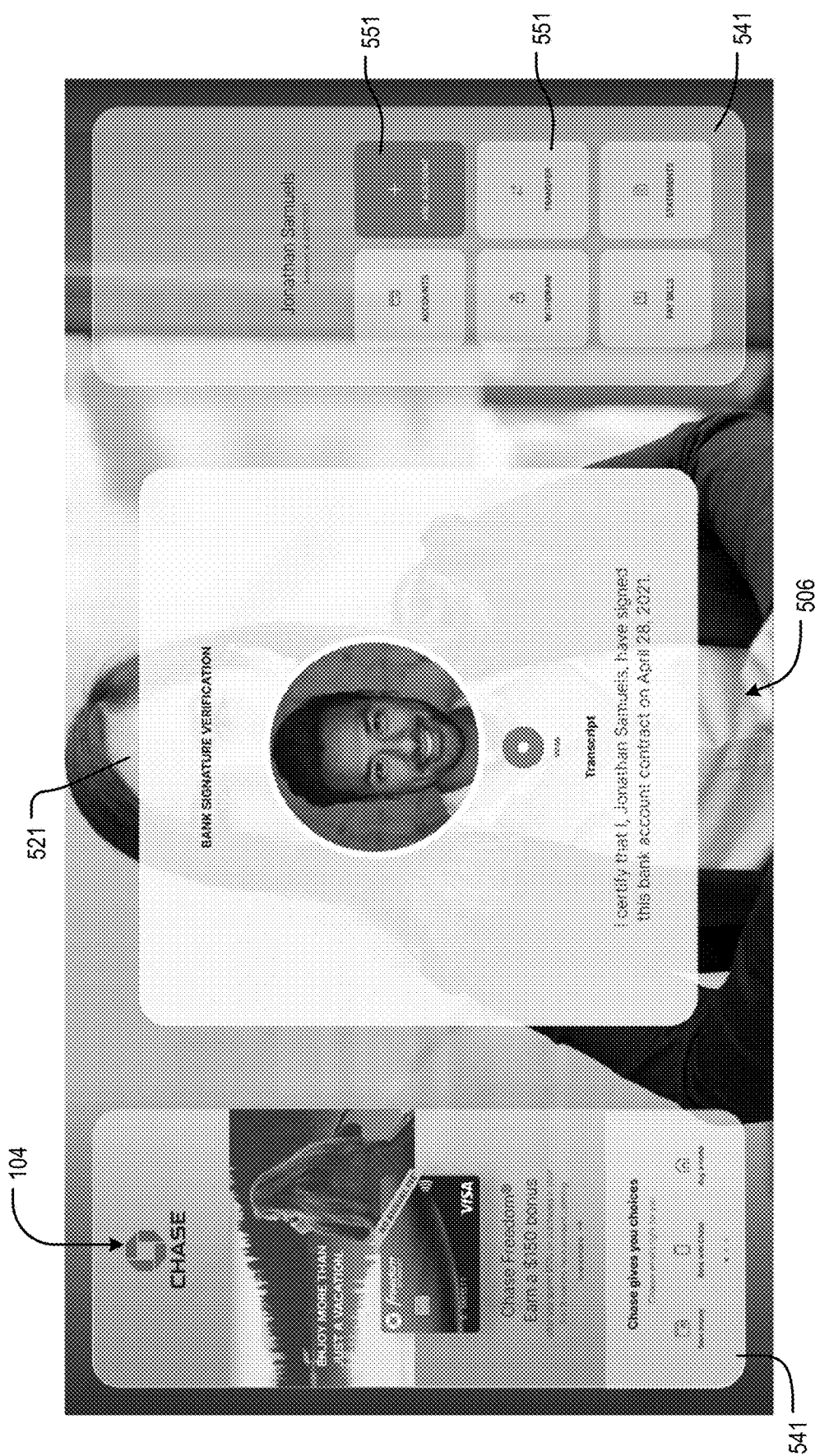
FIG. 5G is an illustration of an implementation of a method, according to an exemplary embodiment of the present disclosure.
Figure 5H:
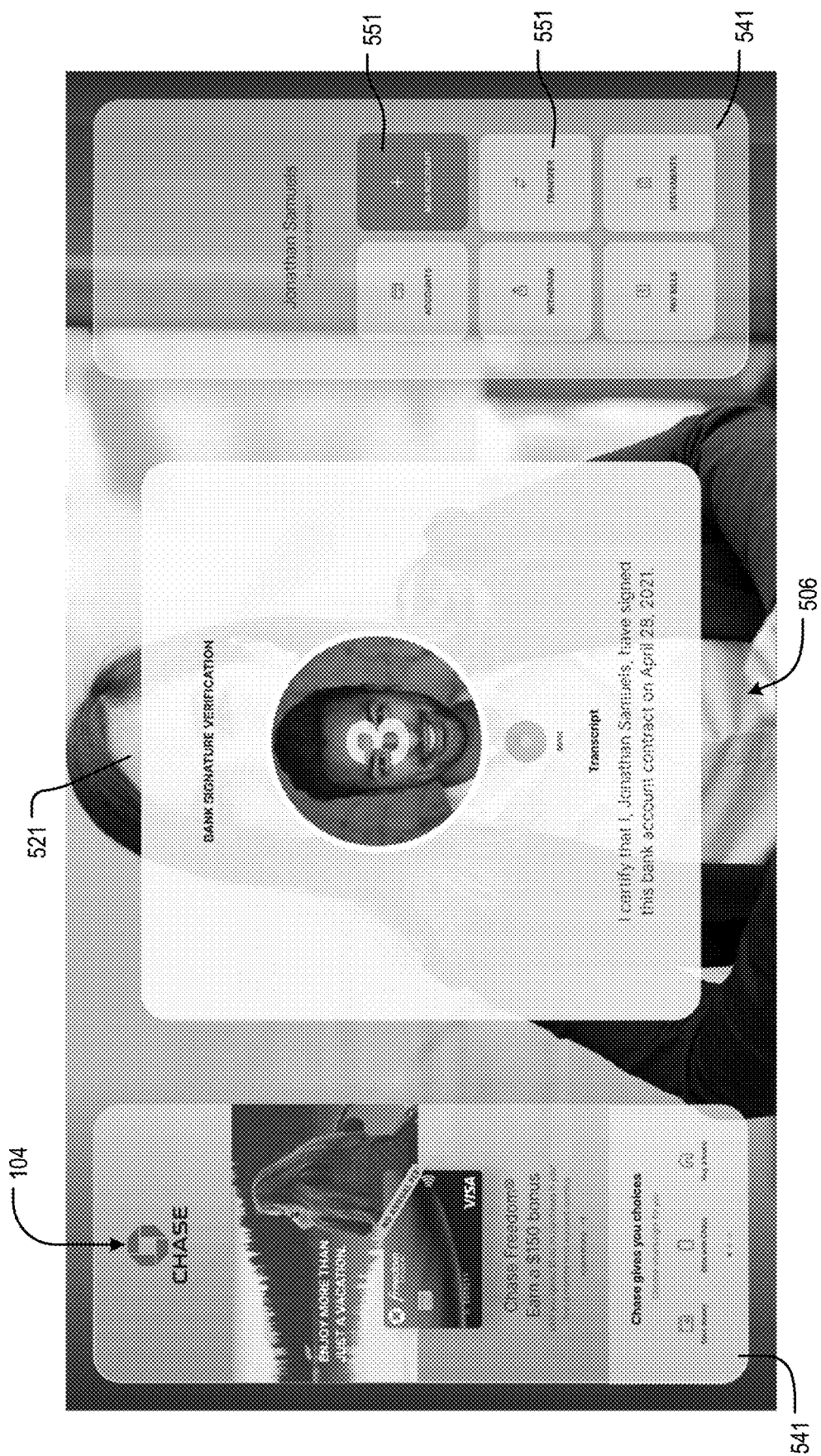
FIG. 5H is an illustration of an implementation of a method, according to an exemplary embodiment of the present disclosure.
Figure 5I:
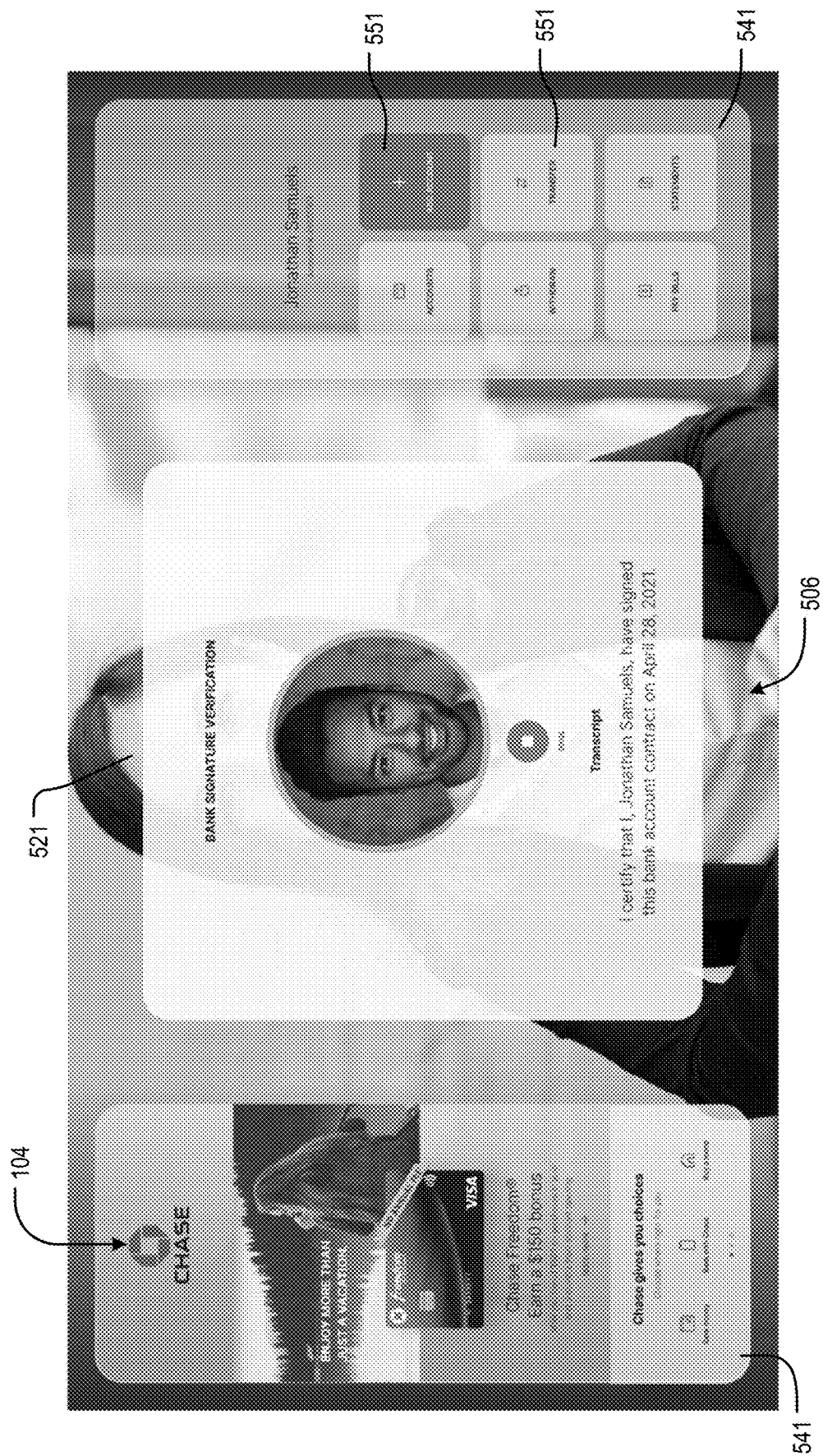
FIG. 5I is an illustration of an implementation of a method, according to an exemplary embodiment of the present disclosure.
Figure 5J:
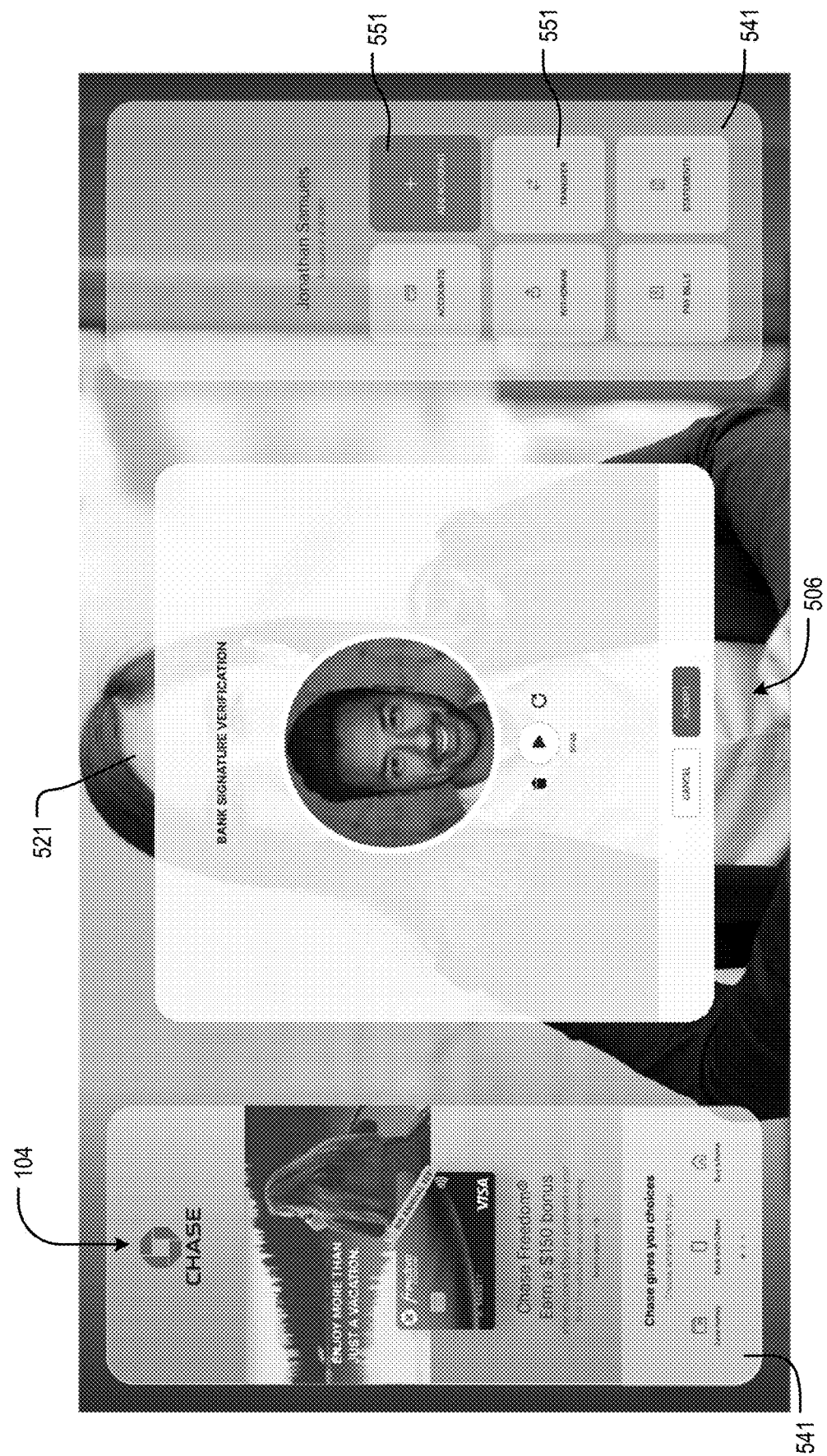
FIG. 5J is an illustration of an implementation of a method, according to an exemplary embodiment of the present disclosure.
Figure 5K:
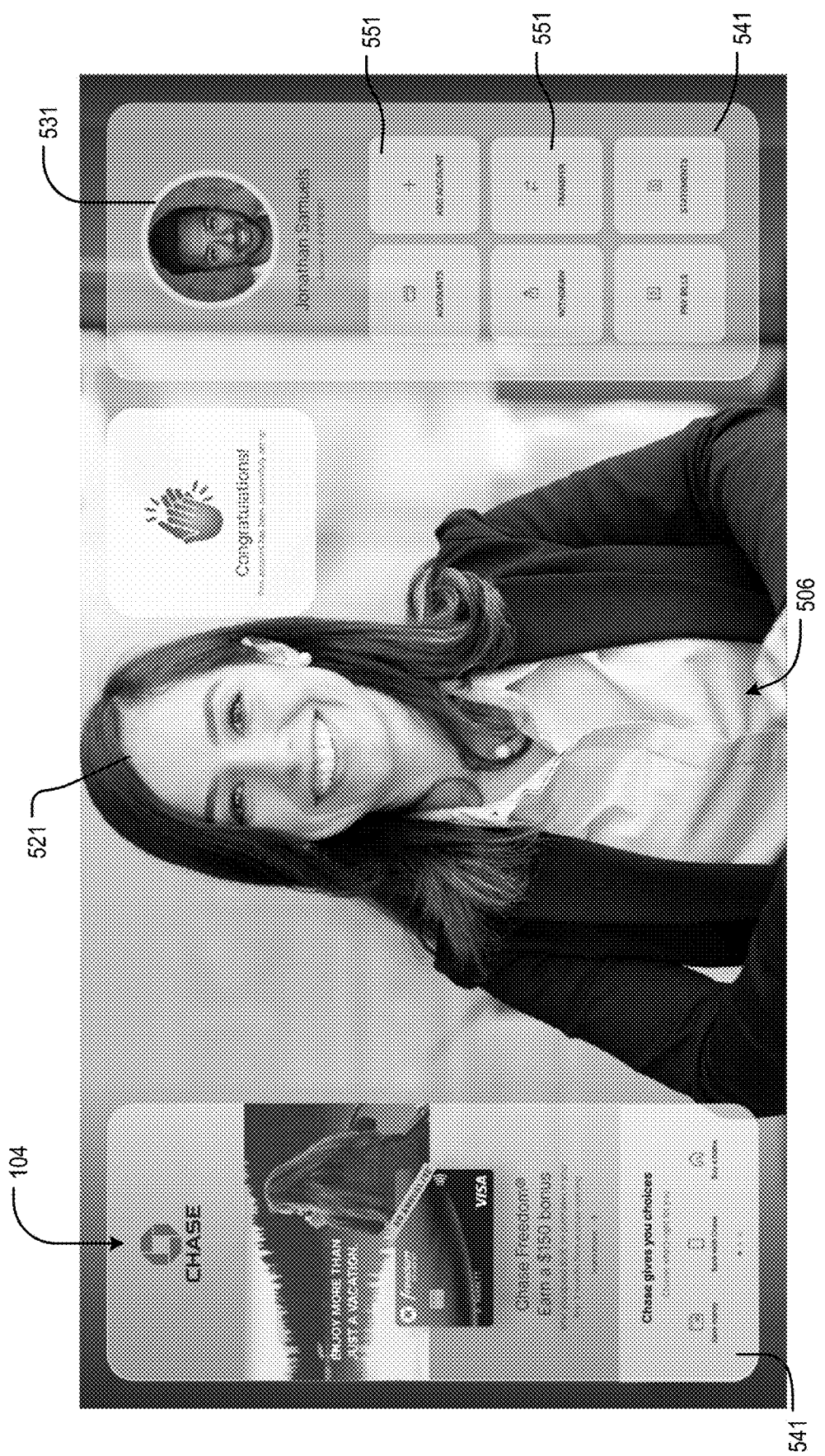
FIG. 5K is an illustration of an implementation of a method, according to an exemplary embodiment of the present disclosure.

As shown in FIG. 5G, the potential bank member 531 may be prompted with a transcript that is to be read back and recorded via the digital content 541 to confirm the approval of the potential bank member 531. As shown in FIG. 5H and FIG. SI, the potential bank member 531 may instructed by a countdown and an indication of live recording. FIG. 5J illustrates an aspect of the digital content 541 that allows the potential bank member 531 to review the recorded spoken transcript approving the bank contract 561. Once completed, as shown in FIG. 5K, the digital content 541 can display a congratulatory graphic and welcome the newest member of the bank. Each of these steps can be associated with a same reference patch corresponding to digital content that guides the new bank member along the account setup process via the third device 702.

According to an embodiment, the above examples allow for live streaming of data from one device to another (or many others), where frames of the data stream include the reference patch. The data stream could be a display of a cloud-based slide within a live video, a webcam feed, or other similar data source. The streamed reference patch can be recognized by (processing circuitry of) the first device 701 receiving the data stream and can initiate retrieval and displaying of digital content associated with the reference patch. Device(s) receiving the streamed data, which may be a screen share, a live webcam feed, and the like, can then render the digital content locally on the device(s).

Further to the above, the reference patch may be used to generate digital content for a variety of implementations. Such implementations can include renewing a motor vehicle driver's license, signing a contract, obtaining a notarization from a notary public, renewing a travel document, and the like.

It can be appreciated that the present disclosure is not limited to the above-described examples. In these examples, the user of the first device 701 may act in a manner of remote control. In one instance, the yoga instructor can remotely control an experience for his/her students. In another instance, the bank teller can remotely control an experience for the new account owner. In the instance of the yoga instructor, the remote control is provided between many devices, where the yoga instructor is able to control an experience of a plurality of participants from a single first device 701. However, in the instance of the bank teller, the remote control is provided between only two devices, where the bank teller is able to control the display of the new account owner.

In an embodiment, there may be synchronized experiences between only two devices and/or a synchronized experience from one device to many devices. For example, two individuals may play chess over live video of the competitor. This is a synchronized experience between only two devices. Similarly, five friends may watch a live football game on separate devices, where the betting experience digital content (e.g., DraftKings, etc.) is overlaid on each of their devices. A synchronized experience may be shared amongst the devices. In other words, this is a synchronized experience from one device to many devices, wherein the one device is generated by the host of the football game stream.

According to an embodiment, the reference patch can be inserted into, as part of the displayed data, recorded video that is to be displayed on the first device 701. In an example, the first device 701 decodes the recorded video and, based on the identified presence of the reference patch, can locally-augment the display of the first device 701 to overlay the intended digital content on the recorded video. The design and the arrangement of the digital content can be provided relative to the reference patch placed into the displayed data. The reference patch may be placed into the displayed data, or recorded video, by the original content creator or by another party that wishes to enhance the user visual experience.

In an example, a music video having the reference patch may be played over a video player (e.g., Vimeo) by a fan. The reference patch may retrieve and display digital content that makes it possible for the fan to purchase tickets to the artist's next live concert that is within a predefined radius of a current address, home address, or other address associated with the fan. Here, the live concerts that are loaded in the digital content over the music video, that is being played over the video player, is personalized to each fan and their respective location. The reference patch allows the live concert data to be loaded in real time.

In another example, a recorded educational video from, for instance, Khan Academy can have the reference patch that triggers a quiz for a student watching the video. In this way, the video can be paused while the digital content is rendered, and the student completes the quiz within the digital content. Once the quiz has been completed, the student may proceed to the next segment of the video.

In the above recorded video examples, the reference patch can be placed within recorded streams of data. A decoder present at the end user device can be used to identify the reference patch and then locally augment the display of the end user device to allow for dynamic user interaction with the digital content of the recorded video.

In an embodiment, the digital content can be the same for all viewers of the recorded video. In an embodiment, the digital content may be personalized for each viewer of the recorded video. The digital content can be live and updated in real time (or at the same time scale as the recorded video). The digital content can be attended or non-attended. In other words, a version of the educational video may have a teacher live remote controlling the experience.

In an embodiment, a plurality of the reference patches can be included in the displayed data. That is, the display of the first device 701 need not only display just one of the reference patches on the display at any given time. For example, the slide deck can include three refence patches on a single slide that is being displayed in the displayed data. Each reference patch of the three reference patches can be detected and processed by the first user device 701. In an embodiment, the multiple reference patches can have a priority for displaying the corresponding digital content on the displayed data. The priority can be based on a determined theme of the displayed data detected by the first device 701, or based on an assigned priority value, or a combination thereof, among others. For example, a first reference patch can be an area of the user's face in an image of the user in a slide and have the highest priority, a second reference patch can be an area of a logo of a company employing the user in the slide and have the second-highest priority (by the user device 701), and a third reference patch can be the bottom-right area of the slide and have the third-highest priority. The highest priority of the first reference patch can be assigned to always have the highest priority, while the second reference patch and the third reference patch can have priorities that are not assigned and thus determined by the user device 701 based on a relation to content in the displayed data.

Embodiments of the subject matter and the functional operations described in this specification are implemented by processing circuitry (on one or more of devices 701-70n, 850, and 1001), in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the devices of FIG. 1 or the like). The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both or any other kind of central processing unit. Generally, a CPU will receive instructions and data from a read-only memory or a random-access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Electronic device 600 shown in FIG. 6 can be an example of one or more of the devices shown in FIG. 1. In an embodiment, the device 600 may be a smartphone. However, the skilled artisan will appreciate that the features described herein may be adapted to be implemented on other devices (e.g., a laptop, a tablet, a server, an e-reader, a camera, a navigation device, etc.). The device 600 of FIG. 6 includes processing circuitry, as discussed above. The processing circuitry includes one or more of the elements discussed next with reference to FIG. 6. The device 600 may include other components not explicitly illustrated in FIG. 6 such as a CPU, GPU, frame buffer, etc. The device 600 includes a controller 610 and a wireless communication processor 602 connected to an antenna 601. A speaker 604 and a microphone 605 are connected to a voice processor 603.

The controller 610 may include one or more processors/processing circuitry (CPU, GPU, or other circuitry) and may control each element in the device 600 to perform functions related to communication control, audio signal processing, graphics processing, control for the audio signal processing, still and moving image processing and control, and other kinds of signal processing. The controller 610 may perform these functions by executing instructions stored in a memory 650. Alternatively, or in addition to the local storage of the memory 650, the functions may be executed using instructions stored on an external device accessed on a network or on a non-transitory computer readable medium.

The memory 650 includes but is not limited to Read Only Memory (ROM), Random Access Memory (RAM), or a memory array including a combination of volatile and non-volatile memory units. The memory 650 may be utilized as working memory by the controller 610 while executing the processes and algorithms of the present disclosure. Additionally, the memory 650 may be used for long-term storage, e.g., of image data and information related thereto.

The device 600 includes a control line CL and data line DL as internal communication bus lines. Control data to/from the controller 610 may be transmitted through the control line CL. The data line DL may be used for transmission of voice data, display data, etc.

The antenna 601 transmits/receives electromagnetic wave signals between base stations for performing radio-based communication, such as the various forms of cellular telephone communication. The wireless communication processor 602 controls the communication performed between the device 600 and other external devices via the antenna 601. For example, the wireless communication processor 602 may control communication between base stations for cellular phone communication.

The speaker 604 emits an audio signal corresponding to audio data supplied from the voice processor 603. The microphone 605 detects surrounding audio and converts the detected audio into an audio signal. The audio signal may then be output to the voice processor 603 for further processing. The voice processor 603 demodulates and/or decodes the audio data read from the memory 650 or audio data received by the wireless communication processor 602 and/or a short-distance wireless communication processor 607. Additionally, the voice processor 603 may decode audio signals obtained by the microphone 605.

The exemplary device 600 may also include a display 620, a touch panel 630, an operation key 640, and a short-distance communication processor 607 connected to an antenna 606. The display 620 may be an LCD, an organic electroluminescence display panel, or another display screen technology. In addition to displaying still and moving image data, the display 620 may display operational inputs, such as numbers or icons which may be used for control of the device 600. The display 620 may additionally display a GUI for a user to control aspects of the device 600 and/or other devices. Further, the display 620 may display characters and images received by the device 600 and/or stored in the memory 650 or accessed from an external device on a network. For example, the device 600 may access a network such as the Internet and display text and/or images transmitted from a Web server.

The touch panel 630 may include a physical touch panel display screen and a touch panel driver. The touch panel 630 may include one or more touch sensors for detecting an input operation on an operation surface of the touch panel display screen. The touch panel 630 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 630 may detect when the stylus approaches/contacts the operation surface of the touch panel display (similar to the case in which a finger is used for the touch operation).

In certain aspects of the present disclosure, the touch panel 630 may be disposed adjacent to the display 620 (e.g., laminated) or may be formed integrally with the display 620. For simplicity, the present disclosure assumes the touch panel 630 is formed integrally with the display 620 and therefore, examples discussed herein may describe touch operations being performed on the surface of the display 620 rather than the touch panel 630. However, the skilled artisan will appreciate that this is not limiting.

For simplicity, the present disclosure assumes the touch panel 630 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 630 may include transparent electrode touch sensors arranged in the X-Y direction on the surface of transparent sensor glass.

The touch panel driver may be included in the touch panel 630 for control processing related to the touch panel 630, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 630 may detect a position of a user's finger around an edge of the display panel 620 (e.g., gripping a protective case that surrounds the display/touch panel). Signals may be transmitted by the touch panel driver, e.g., in response to a detection of a touch operation, in response to a query from another element based on timed data exchange, etc.

The touch panel 630 and the display 620 may be surrounded by a protective casing, which may also enclose the other elements included in the device 600. In an embodiment, a position of the user's fingers on the protective casing (but not directly on the surface of the display 620) may be detected by the touch panel 630 sensors. Accordingly, the controller 610 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 610 may be configured to detect which hand is holding the device 600, based on the detected finger position. For example, the touch panel 630 sensors may detect a plurality of fingers on the left side of the device 600 (e.g., on an edge of the display 620 or on the protective casing), and detect a single finger on the right side of the device 600. In this exemplary scenario, the controller 610 may determine that the user is holding the device 600 with his/her right hand because the detected grip pattern corresponds to an expected pattern when the device 600 is held only with the right hand.

The operation key 640 may include one or more buttons or similar external control elements, which may generate an operation signal based on a detected input by the user. In addition to outputs from the touch panel 630, these operation signals may be supplied to the controller 610 for performing related processing and control. In certain aspects of the present disclosure, the processing and/or functions associated with external buttons and the like may be performed by the controller 610 in response to an input operation on the touch panel 630 display screen rather than the external button, key, etc. In this way, external buttons on the device 600 may be eliminated in lieu of performing inputs via touch operations, thereby improving watertightness.

The antenna 606 may transmit/receive electromagnetic wave signals to/from other external apparatuses, and the short-distance wireless communication processor 607 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 607.

The device 600 may include a motion sensor 608. The motion sensor 608 may detect features of motion (i.e., one or more movements) of the device 600. For example, the motion sensor 608 may include an accelerometer to detect acceleration, a gyroscope to detect angular velocity, a geomagnetic sensor to detect direction, a geo-location sensor to detect location, etc., or a combination thereof to detect motion of the device 600. In an embodiment, the motion sensor 608 may generate a detection signal that includes data representing the detected motion. For example, the motion sensor 608 may determine a number of distinct movements in a motion (e.g., from start of the series of movements to the stop, within a predetermined time interval, etc.), a number of physical shocks on the device 600 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 610, whereby further processing may be performed based on data included in the detection signal. The motion sensor 608 can work in conjunction with a Global Positioning System (GPS) section 660. The information of the present position detected by the GPS section 660 is transmitted to the controller 610. An antenna 661 is connected to the GPS section 660 for receiving and transmitting signals to and from a GPS satellite.

The device 600 may include a camera section 609, which includes a lens and shutter for capturing photographs of the surroundings around the device 600. In an embodiment, the camera section 609 captures surroundings of an opposite side of the device 600 from the user. The images of the captured photographs can be displayed on the display panel 620. A memory section saves the captured photographs. The memory section may reside within the camera section 609 or it may be part of the memory 650. The camera section 609 can be a separate feature attached to the device 600 or it can be a built-in camera feature.

An example of a type of computer is shown in FIG. 7. The computer 700 can be used for the operations described in association with any of the computer-implement methods described previously, according to one implementation. For example, the computer 700 can be an example of devices 701, 702, 70*n*, 1001, or a server (such as device 850). The computer 700 includes processing circuitry, as discussed above. The device 850 may include other components not explicitly illustrated in FIG. 7 such as a CPU, GPU, frame buffer, etc. The processing circuitry includes one or more of the elements discussed next with reference to FIG. 7. In FIG. 7, the computer 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the computer 700. In one implementation, the memory 720 is a computer-readable medium. In one implementation, the memory 720 is a volatile memory. In another implementation, the memory 720 is a non-volatile memory.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the computer 700. In one implementation, the input/output device 740 includes a keyboard and/or pointing device. In another implementation, the input/output device 740 includes a display for displaying graphical user interfaces.

Next, a hardware description of a device 801 according to exemplary embodiments is described with reference to FIG. 8. In FIG. 8, the device 801, which can be the above described devices of FIG. 1, includes processing circuitry, as discussed above. The processing circuitry includes one or more of the elements discussed next with reference to FIG. 8. The device 801 may include other components not explicitly illustrated in FIG. 8 such as a CPU, GPU, frame buffer, etc. In FIG. 8, the device 801 includes a CPU 800 which performs the processes described above/below. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 800 and an operating system such as Microsoft Windows, UNIX, Solaris, LINUX, Apple MAC-OS and other systems known to those skilled in the art.

The hardware elements in order to achieve the device may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the processes described above. CPU 800 can be an example of the CPU illustrated in each of the devices of FIG. 1.

The device 801 in FIG. 8 also includes a network controller 806, such as an Intel Ethernet PRO network interface card from Intel Corporation of America, for interfacing with the network 851 (also shown in FIG. 1), and to communicate with the other devices of FIG. 1. As can be appreciated, the network 851 can be a public network, such as the Internet, or a private network such as an LAN or WAN network, or any combination thereof and can also include PSTN or ISDN sub-networks. The network 851 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 808, such as a NVIDIA GeForce GTX or Quadro graphics adaptor from NVIDIA Corporation of America for interfacing with display 810, such as an LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners.

A sound controller 820 is also provided in the device to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parenthetical s.

(1) An apparatus, including: processing circuitry, including a graphics processing unit (GPU), configured to access a frame buffer of the GPU, analyze, in the frame buffer of the GPU, a frame representing a section of a stream of displayed data that is being displayed by the apparatus, based on the analyzed frame, identify a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data, decode the encoded data of the unique identifier, after decoding the encoded data of the unique identifier, retrieve the secondary digital content from the remote device based on the unique identifier, and after retrieving the secondary digital content from the remote device, overlay the secondary digital content into the displayed data in accordance with the available area, the screen position, and the size identified by the unique identifier.

(2) The apparatus of (1), wherein the processing circuitry is further configured to analyze the frame by processing attributes of each pixel included in the frame, and detecting groups of pixels included in the frame that have a predetermined pattern of pixel luma and chroma manipulation.

(3) The apparatus of either (1) or (2), wherein the processing circuitry is configured to identify the reference patch by detecting a predetermined pattern of pixel luma and chroma manipulation included in the reference patch, the predetermined pattern corresponding to a size of the available area, and detecting a predetermined edging pattern of pixel luma and chroma manipulation included in the reference patch, the predetermined edging pattern corresponding to a perimeter of the available area.

(4) The apparatus of any one of (1) to (3), wherein the processing circuitry is configured to, prior to overlaying the secondary digital content into the displayed data, adjust, based on the predetermined pattern and the predetermined edging pattern, the size and a perimeter of the secondary digital content.

(5) The apparatus of any one of (1) to (4), wherein the processing circuitry is configured to retrieve metadata associated with the secondary digital content, and set, based on the metadata, an access control parameter indicating a geographic location, a user, a date and time, a duration, or a type of display for which the secondary digital content is viewable when overlaid into the displayed data.

(6) The apparatus of any one of (1) to (5), wherein the processing circuitry is configured to identify the reference patch based on a confidence level, the confidence level being high when a predetermined pattern of pixel luma and chroma manipulation and a predetermined edging pattern of pixel luma and chroma manipulation are detected in the reference patch.

(7) A method, including accessing a frame buffer of a graphics processing unit (GPU); analyzing, in the frame buffer of the GPU, a frame representing a section of a stream of displayed data that is being displayed by an apparatus; based on the analyzed frame, identifying a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data; decoding the encoded data of the unique identifier; after decoding the encoded data of the unique identifier, retrieving the secondary digital content from the remote device based on the unique identifier; and after retrieving the secondary digital content from the remote device, overlaying the secondary digital content into the displayed data in accordance with the available area, the screen position, and the size identified by the unique identifier.

(8) The method of (7), wherein the analyzing of the frame further comprises processing attributes of each pixel included in the frame; and detecting groups of pixels included in the frame that have a predetermined pattern of pixel luma and chroma manipulation.

(9) The method of either (7) or (8), wherein the identifying of the reference patch further comprises detecting a predetermined pattern of pixel luma and chroma manipulation included in the reference patch, the predetermined pattern corresponding to a size of the available area; and detecting a predetermined edging pattern of pixel luma and chroma manipulation included in the reference patch, the predetermined edging pattern corresponding to a perimeter of the available area.

(10) The method of (9), further comprising prior to overlaying the secondary digital content into the displayed data, adjusting, based on the predetermined pattern and the predetermined edging pattern, the size and a perimeter of the secondary digital content.

(11) The method of any one of (7) to (10), wherein the identifying of the reference patch is based on a confidence level, the confidence level being high when a predetermined pattern of pixel luma and chroma manipulation and a predetermined edging pattern of pixel luma and chroma manipulation are detected in the reference patch.

(12) The method of any one of (7) to (11), further comprising continuously analyzing subsequent frames of the stream; and adjusting the overlay of the secondary digital content based on changes of the displayed data in the subsequent frames of the stream.

(13) The method of any one of (7) to (11), further comprising retrieving metadata associated with the secondary digital content; and setting, based on the metadata, an access control parameter indicating a geographic location, a user, a date and time, a duration, or a type of display for which the secondary digital content is viewable when overlaid into the displayed data.

(14) A non-transitory computer-readable storage medium for storing computer-readable instructions that, when executed by a computer, cause the computer to perform a method, the method including: accessing a frame buffer of a graphics processing unit (GPU); analyzing, in the frame buffer of the GPU, a frame representing a section of a stream of displayed data that is being displayed by an apparatus; based on the analyzed frame, identifying a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data; decoding the encoded data of the unique identifier; after decoding the encoded data of the unique identifier, retrieving the secondary digital content from the remote device based on the unique identifier; and after retrieving the secondary digital content from the remote device, overlaying the secondary digital content into the displayed data in accordance with the available area, the screen position, and the size identified by the unique identifier.

(15) The non-transitory computer-readable storage medium of (14), wherein the analyzing of the frame further comprises processing attributes of each pixel included in the frame; and detecting groups of pixels included in the frame that have a predetermined pattern of pixel luma and chroma manipulation.

(16) The non-transitory computer-readable storage medium of either (14) or (15), wherein the identifying of the reference patch further comprises detecting a predetermined pattern of pixel luma and chroma manipulation included in the reference patch, the predetermined pattern corresponding to a size of the available area; and detecting a predetermined edging pattern of pixel luma and chroma manipulation included in the reference patch, the predetermined edging pattern corresponding to a perimeter of the available area.

(17) The non-transitory computer-readable storage medium of any one of (16), further comprising prior to overlaying the secondary digital content into the displayed data, adjusting, based on the predetermined pattern and the predetermined edging pattern, the size and a perimeter of the secondary digital content.

(18) The non-transitory computer-readable storage medium of any one of (14) to (16), wherein the identifying of the reference patch is based on a confidence level, the confidence level being high when a predetermined pattern of pixel luma and chroma manipulation and a predetermined edging pattern of pixel luma and chroma manipulation are detected in the reference patch.

(19) The non-transitory computer-readable storage medium of any one of (15) to (18), further comprising continuously analyzing subsequent frames of the stream; and adjusting the overlay of the secondary digital content based on changes of the displayed data in the subsequent frames of the stream.

(20) The non-transitory computer-readable storage medium of any one of (15) to (19), further comprising retrieving metadata associated with the secondary digital content; and setting, based on the metadata, an access control parameter indicating a geographic location, a user, a date and time, a duration, or a type of display for which the secondary digital content is viewable when overlaid into the displayed data.

(21) A method of augmenting displayed data, including: receiving, via processing circuitry, a unique identifier included in a reference patch embedded in the displayed data, the unique identifier being detected and decoded by an electronic device, the unique identifier associated with an available area in which secondary digital content is insertable in the displayed data that is being displayed by the electronic device, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data; retrieving, via the processing circuitry, the secondary digital content from the remote device based on the unique identifier; transmitting, via the processing circuitry, the secondary digital content to the electronic device; and instructing, via the processing circuitry, the electronic device to overlay the secondary digital content into the displayed data in accordance with the available area at the screen position and with the size identified by the unique identifier.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:
1. An apparatus, comprising:
processing circuitry, including a graphics processing unit (GPU), configured to
access a frame buffer of the GPU,
analyze, in the frame buffer of the GPU, a frame representing a section of a stream of displayed data that is being displayed by the apparatus,
based on the analyzed frame, identify a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data, decode the encoded data of the unique identifier, after decoding the encoded data of the unique identifier, retrieve the secondary digital content from the remote device based on the unique identifier, and after retrieving the secondary digital content from the remote device, overlay the secondary digital content into the displayed data in accordance with the available area, the screen position, and the size identified by the unique identifier.

2. The apparatus of claim 1, wherein the processing circuitry is configured to analyze the frame by processing attributes of each pixel included in the frame, and detecting groups of pixels included in the frame that have a predetermined pattern of pixel luma and chroma manipulation.

3. The apparatus of claim 1, wherein the processing circuitry is configured to identify the reference patch by detecting a predetermined pattern of pixel luma and chroma manipulation included in the reference patch, the predetermined pattern corresponding to a size of the available area, and detecting a predetermined edging pattern of pixel luma and chroma manipulation included in the reference patch, the predetermined edging pattern corresponding to a perimeter of the available area.

4. The apparatus of claim 3, wherein the processing circuitry is configured to, prior to overlaying the secondary digital content into the displayed data, adjust, based on the predetermined pattern and the predetermined edging pattern, the size and a perimeter of the secondary digital content.

5. The apparatus of claim 1, wherein the processing circuitry is configured to retrieve metadata associated with the secondary digital content, and set, based on the metadata, an access control parameter indicating a geographic location, a user, a date and time, a duration, or a type of display for which the secondary digital content is viewable when overlaid into the displayed data.

6. The apparatus of claim 1, wherein the processing circuitry is configured to identify the reference patch based on a confidence level, the confidence level being high when a predetermined pattern of pixel luma and chroma manipulation and a predetermined edging pattern of pixel luma and chroma manipulation are detected in the reference patch.

7. A method, comprising:

accessing a frame buffer of a graphics processing unit (GPU);

analyzing, in the frame buffer of the GPU, a frame representing a section of a stream of displayed data that is being displayed by an apparatus;

based on the analyzed frame, identifying a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data;

decoding the encoded data of the unique identifier;

after decoding the encoded data of the unique identifier, retrieving the secondary digital content from the remote device based on the unique identifier; and after retrieving the secondary digital content from the remote device, overlaying the secondary digital content into the displayed data in accordance with the available area, the screen position, and the size identified by the unique identifier.

8. The method of claim 7, wherein the analyzing of the frame further comprises processing attributes of each pixel included in the frame; and detecting groups of pixels included in the frame that have a predetermined pattern of pixel luma and chroma manipulation.

9. The method of claim 7, wherein the identifying of the reference patch further comprises detecting a predetermined pattern of pixel luma and chroma manipulation included in the reference patch, the predetermined pattern corresponding to a size of the available area; and detecting a predetermined edging pattern of pixel luma and chroma manipulation included in the reference patch, the predetermined edging pattern corresponding to a perimeter of the available area.

10. The method of claim 9, further comprising prior to overlaying the secondary digital content into the displayed data, adjusting, based on the predetermined pattern and the predetermined edging pattern, the size and a perimeter of the secondary digital content.

11. The method of claim 7, wherein the identifying of the reference patch is based on a confidence level, the confidence level being high when a predetermined pattern of pixel luma and chroma manipulation and a predetermined edging pattern of pixel luma and chroma manipulation are detected in the reference patch.

12. The method of claim 7, further comprising continuously analyzing subsequent frames of the stream; and adjusting the overlay of the secondary digital content based on changes of the displayed data in the subsequent frames of the stream.

13. The method of claim 7, further comprising retrieving metadata associated with the secondary digital content; and setting, based on the metadata, an access control parameter indicating a geographic location, a user, a date and time, a duration, or a type of display for which the secondary digital content is viewable when overlaid into the displayed data.

14. A non-transitory computer-readable storage medium for storing computer-readable instructions that, when executed by a computer, cause the computer to perform a method, the method comprising:

accessing a frame buffer of a graphics processing unit (GPU);

analyzing, in the frame buffer of the GPU, a frame representing a section of a stream of displayed data that is being displayed by an apparatus;

based on the analyzed frame, identifying a reference patch that includes a unique identifier associated with an available area in which secondary digital content is insertable in the displayed data that is being displayed by the apparatus, the unique identifier including encoded data that identifies the secondary digital content, a location address of the secondary digital content at a remote device, a screen position within the available area at which the secondary digital content is insertable in the displayed data, and a size of the secondary digital content when inserted in the displayed data;

decoding the encoded data of the unique identifier;

after decoding the encoded data of the unique identifier, retrieving the secondary digital content from the remote device based on the unique identifier; and after retrieving the secondary digital content from the remote device, overlaying the secondary digital content into the displayed data in accordance with the available area, the screen position, and the size identified by the unique identifier.

15. The non-transitory computer-readable storage medium according to claim 14, wherein the analyzing of the frame further comprises processing attributes of each pixel included in the frame; and detecting groups of pixels included in the frame that have a predetermined pattern of pixel luma and chroma manipulation.

16. The non-transitory computer-readable storage medium according to claim 14, wherein the identifying of the reference patch further comprises detecting a predetermined pattern of pixel luma and chroma manipulation included in the reference patch, the predetermined pattern corresponding to a size of the available area; and detecting a predetermined edging pattern of pixel luma and chroma manipulation included in the reference patch, the predetermined edging pattern corresponding to a perimeter of the available area.

17. The non-transitory computer-readable storage medium according to claim 16, further comprising prior to overlaying the secondary digital content into the displayed data, adjusting, based on the predetermined pattern and the predetermined edging pattern, the size and a perimeter of the secondary digital content.

18. The non-transitory computer-readable storage medium according to claim 14, wherein the identifying of the reference patch is based on a confidence level, the confidence level being high when a predetermined pattern of pixel luma and chroma manipulation and a predetermined edging pattern of pixel luma and chroma manipulation are detected in the reference patch.

19. The non-transitory computer-readable storage medium according to claim 15, further comprising continuously analyzing subsequent frames of the stream; and adjusting the overlay of the secondary digital content based on changes of the displayed data in the subsequent frames of the stream.

20. The non-transitory computer-readable storage medium according to claim 14, further comprising retrieving metadata associated with the secondary digital content; and setting, based on the metadata, an access control parameter indicating a geographic location, a user, a date and time, a duration, or a type of display for which the secondary digital content is viewable when overlaid into the displayed data.

* * * * *